US012210481B2

(12) United States Patent
Zhu

(10) Patent No.: US 12,210,481 B2
(45) Date of Patent: Jan. 28, 2025

(54) FILE SYSTEM DATA ACCESS METHOD AND FILE SYSTEM

(71) Applicant: Alibaba Group Holding Limited, Grand Cayman (KY)

(72) Inventor: Jiaji Zhu, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 486 days.

(21) Appl. No.: 17/092,086

(22) Filed: Nov. 6, 2020

(65) Prior Publication Data

US 2021/0056074 A1   Feb. 25, 2021

Related U.S. Application Data

(63) Continuation of application No. PCT/CN2019/087691, filed on May 21, 2019.

(30) Foreign Application Priority Data

Jun. 1, 2018   (CN) .......................... 201810558071.1

(51) Int. Cl.
*G06F 16/00*   (2019.01)
*G06F 16/13*   (2019.01)
*G06F 16/16*   (2019.01)

(52) U.S. Cl.
CPC ............ *G06F 16/13* (2019.01); *G06F 16/164* (2019.01)

(58) Field of Classification Search
CPC ............................... G06F 16/13; G06F 16/164
See application file for complete search history.

(56) References Cited

U.S. PATENT DOCUMENTS 7,631,020 B1 *  12/2009  Wei ....................... G06F 16/219
8,788,773 B2    7/2014   Goodman et al.
(Continued)

FOREIGN PATENT DOCUMENTS

| CN | 1605989 A | 4/2005 |
| CN | 101256526 A | 9/2008 |

(Continued)

OTHER PUBLICATIONS

Extended European Search Report mailed Jan. 21, 2022 for European Patent Application No. 19811764.0, 7 pages.

(Continued)

*Primary Examiner* — Dinku W Gebresenbet
(74) *Attorney, Agent, or Firm* — Lee & Hayes, P.C.

(57) ABSTRACT

A method is implemented by a computing node, and includes: sending a mounting request triggered for a target logical volume to a target storage node of multiple storage nodes included in a file system; receiving storage location information of a log segment and a checkpoint corresponding to the target logical volume sent by the target storage node; reading log metadata of the log segment and the checkpoint according to the storage location information to restore a data state of the target logical volume; and performing data access processing based on the data state of the (Continued)

target logical volume. When multiple computing nodes access a target logical volume, read and write consistency of the multiple computing nodes can be maintained based on log information of the target logical volume maintained by various storage nodes. Furthermore, reading and writing can be performed synchronously, thus avoiding read and write conflicts.

20 Claims, 17 Drawing Sheets

(56) References Cited

U.S. PATENT DOCUMENTS

| | | | |
|---|---|---|---|
| 8,935,431 | B2 | 1/2015 | Oehme et al. |
| 9,235,479 | B1 | 1/2016 | Muntz et al. |
| 9,276,980 | B2 | 3/2016 | Chan et al. |
| 9,507,800 | B2 | 11/2016 | Narayanamurthy et al. |
| 9,626,250 | B2 | 4/2017 | Chen et al. |
| 10,353,871 | B2 | 7/2019 | Vibhor et al. |
| 10,514,853 | B2 | 12/2019 | Kumarasamy |
| 2010/0114889 | A1* | 5/2010 | Rabii .................. G06F 16/1824 707/E17.032 |
| 2011/0113017 | A1 | 5/2011 | Laberge |
| 2011/0276754 | A1* | 11/2011 | Bish ........................ G06F 3/065 711/111 |
| 2014/0310483 | A1* | 10/2014 | Bennett ................... G06F 3/064 711/154 |
| 2016/0041880 | A1 | 2/2016 | Mitkar et al. |
| 2016/0055166 | A1* | 2/2016 | Guilford ............... G06F 16/196 707/752 |
| 2016/0085472 | A1 | 3/2016 | Takeuchi et al. |
| 2017/0011054 | A1* | 1/2017 | Chennamsetty ...... G06F 16/172 |
| 2018/0137291 | A1* | 5/2018 | Ho ........................ G06F 21/602 |
| 2019/0012104 | A1* | 1/2019 | Schreter ................ G06F 3/0611 |
| 2019/0339894 | A1* | 11/2019 | Bensberg .............. G06F 3/0644 |

FOREIGN PATENT DOCUMENTS

| | | |
|---|---|---|
| CN | 102164177 A | 8/2011 |
| CN | 102394923 A | 3/2012 |
| CN | 102664923 A | 9/2012 |
| CN | 103561101 A | 2/2014 |
| CN | 104866435 A | 8/2015 |
| CN | 105531675 A | 4/2016 |
| CN | 105718217 A | 6/2016 |
| JP | H08329102 A | 12/1996 |
| JP | 2005050024 A | 2/2005 |
| JP | 2009251791 A | 10/2009 |
| JP | 2016021110 A | 2/2016 |
| JP | 2016530598 A | 9/2016 |
| WO | WO2014203023 A1 | 12/2014 |

OTHER PUBLICATIONS

English translation of International Search Report mailed Aug. 29, 2019, from corresponding PCT Application No. PCT/CN2019/087691, 2 pages.
English translation of Written Opinion mailed Aug. 29, 2019, from corresponding PCT Application No. PCT/CN2019/087691, 4 pages.
Translation of Chinese First Search Report for CN Application No. 201810558071.1 mailed Aug. 23, 2022, 1 page.
Japanese Office Action mailed Jun. 19, 2023, for Japanese Patent Application No. 2020-567024, a foreign counterpart to U.S. Appl. No. 17/092,086, 3 pages.

* cited by examiner

FILE SYSTEM DATA ACCESS METHOD AND FILE SYSTEM

CROSS REFERENCE TO RELATED PATENT APPLICATIONS

This application claims priority to and is a continuation of PCT Patent Application No. PCT/CN2019/087691 filed on 21 May 2019, and is related to and claims priority to Chinese Application No. 201810558071.1, filed on 1 Jun. 2018 and entitled "File System Data Access Method and File System," which are hereby incorporated by reference in their entirety.

TECHNICAL FIELD

The present application relates to the technical field of Internet technologies, and particularly to file system data access methods and file systems.

BACKGROUND

Computers manage and store data through file systems. In the era of information explosion, an amount of data generated by various types of network services has increased exponentially to meet the needs of storage capacity, data backup, and data security, etc., of a tremendous volume of data. Distributed file systems have thereby emerged. Simply put, a distributed file system a file system network consisting of many storage nodes, which expands a traditional file system that is fixed in a certain location into multiple file systems in any number of locations. Therefore, when a distributed file system is used, a user does not need to concern about in which storage node data will be stored, or from which storage node data is obtained, but only need to manage and store data as if a local file system is used.

In some cases, users want multiple machines (which can be called computing nodes as compared to storage nodes) to share file systems. In a common scenario, a machine writes data and serves access requests of users, while other machines can read and the latest written data in real time for data analysis or backup, etc., through a shared file system.

With the development of computer network technologies, the number of applications of network technologies has increased, and network-based shared file systems have also been widely used. Currently, file system sharing is implemented by adopting technologies such as Network File System (NFS) and Common Internet File System (CIFS), etc.

However, commonly used NFS/CIFS network shared file systems have bottlenecks in aspects of performance and scalability, which are mainly reflected as follows. In order to support an access consistency of both read and write data by multiple clients (application clients in computing nodes), an independent coordination server is usually deployed in a file system to coordinate all access requests by providing a complex lock competition mechanism. Therefore, any client needs to request a lock from the coordination server before reading and writing data. When an amount of data access increases, the coordination server is likely to cause a bottleneck, resulting in poor system scalability. Moreover, when multiple clients need to read and write the same file data, a lock competition is produced. As such, before a client that does not get a lock reads and writes data, the client needs to wait for another client to finish reading and writing data, thus leading to an increase in delay in data reading and writing, i.e., serious read-write conflicts.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of the above, embodiments of the present disclosure provide a file system data access method and a file system to improve the performance of data accesses associated with file systems.

In implementations, the present disclosure provides a method for accessing data of a file system, which is executed by a computing node. The file system includes at least one computing node and multiple storage nodes. The method includes:
  sending, by the computing node, a mounting request triggered for a target logical volume to a target storage node, wherein the target storage node is any one of the multiple storage nodes, and the target logical volume corresponds to at least some storage resources of the multiple storage nodes;
  receiving, by the computing node, storage location information of a log segment and a checkpoint corresponding to the target logical volume sent by the target storage node;
  reading, by the computing node, log metadata of the log segment and the checkpoint according to the storage location information of the log segment and the checkpoint to restore a data state of the target logical volume; and
  performing, by the computing node, data access processing based on the data state of the target logical volume.

In implementations, the present disclosure provides a method for accessing data of a file system, which is specifically executed by a file system access process in a computing node. The file system includes at least one computing node and multiple storage nodes. The method includes:
  obtaining, by the file system access process in the computing node, storage location information of a log segment and a checkpoint corresponding to a target logical volume through a logical volume service process in a storage node, in response to a mounting request triggered by the data access process in the computing node for the target logical volume;
  reading, by the file system access process, log metadata of the log segment and the checkpoint according to the storage location information of the log segment and the checkpoint to restore a data state of the target logical volume; and
  processing, by the file system access process, data access processing based on the data state of the target logical volume.

In implementations, the present disclosure provides a computing node, which includes a processor and a memory, the memory being configured to store one or more computer instructions, wherein the one or more computer instructions, when executed by the processor, implement the file system data access method in the first aspect or the second aspect.

Such electronic device may also include a communication interface configured to communicate with other devices or a communication network.

In implementations, the present disclosure provides a computer storage medium configured to store a computer program that, when executed by a computer, causes the computer to implement the file system data access method in the first aspect or the second aspect.

In implementations, the present disclosure provides a method for accessing data of a file system, which is executed by a storage node. The file system includes at least one computing node and multiple storage nodes. The method includes:

receiving, by a target storage node, a mounting request corresponding to a target logical volume sent by a computing node, wherein the target storage node is any one of the multiple storage nodes; and sending, by the target storage node, storage location information of a log segment and a checkpoint corresponding to the target logical volume to the computing node, to cause the computing node to restore a data state of the target logical volume used for data access processing based on the storage location information of the log segment and the checkpoint, the target logical volume corresponding to at least a part of storage resources in the multiple storage nodes.

In implementations, the present disclosure provides a method for accessing data of a file system, which is executed by a logical volume service process in a storage node. The file system includes at least one computing node and multiple storage nodes. The method includes:

receiving, by a logical volume service process in a storage node, a mounting request corresponding to a target logical volume sent by a file system access process in a computing node; and sending, by the logical volume service process, storage location information of a first log segment and a checkpoint corresponding to the target logical volume to the file system access process, to cause the file system access process to restore a data state of the target logical volume for data access processing based on the storage location information of the first log segment and the checkpoint, the target logical volume corresponding to at least a part of storage resources in the multiple storage nodes, and the storage node being any one of the multiple storage nodes.

In implementations, the present disclosure provides a storage node, which includes a processor and a memory, the memory being configured to store one or more computer instructions, wherein the one or more computer instructions, when executed by the processor, implement the file system data access method in the fourth aspect or the fifth aspect. Such electronic device may also include a communication interface configured to communicate with other devices or a communication network.

In implementations, the present disclosure provides a computer storage medium configured to store a computer program that, when executed by a computer, causes the computer to implement the file system data access method in the fourth aspect or the fifth aspect.

In implementations, the present disclosure provides a file system, which includes:

at least one computing node, multiple storage nodes, and multiple root servers configured to manage the multiple storage nodes, wherein:

any computing node of the at least one computing node is configured to send a mounting request triggered for a target logical volume to any storage node of the multiple storage nodes, receive storage location information of a log segment and a checkpoint corresponding to the target logical volume from the any storage node, read log metadata of the log segment and the checkpoint according to the storage location information of the log segment and the checkpoint to restore a data state of the target logical volume, and perform data access processing based on the data state of the target logical volume, the target logical volume corresponding to at least a part of storage resources in the multiple storage nodes; and the any storage node is configured to obtain the storage location information of the log segment and the checkpoint corresponding to the target logical volume, and send the storage location information of the log segment and the checkpoint to the any computing node.

In implementations, the present disclosure provides provide a file system, which includes:

at least one computing node, multiple storage nodes, and multiple root servers configured to manage data chunk service processes in the multiple storage nodes, wherein:

each computing node has a data access process and a file system access process;

each storage node has a logical volume service process and a data chunk service process, the data chunk service process being configured to perform reading and writing management of each data chunk stored in the respective storage node;

in response to a mount operation triggered by a data access process in a corresponding computing node, the file system access process sends a mounting request for a target logical volume to a logical volume service process in a target storage node, receives first storage location information of a log segment and a checkpoint corresponding to the target logical volume from the logical volume service process, read log metadata of the log segment and the checkpoint according to the first storage location information of the log segment and the checkpoint to restore a data state of the target logical volume, and perform data access processing based on the data state of the target logical volume, the target logical volume corresponding to at least a part of storage resources in the multiple storage nodes; and the logical volume service process is configured to receive the mounting request sent by the file system access process, and send storage location information of the first log segment and the checkpoint corresponding to the target logical volume to the file system access process.

The file system data access methods and file systems provided by the embodiments of the present disclosure include at least one computing node, multiple storage nodes, and multiple root servers used for managing the multiple storage nodes, wherein data is stored in units of data chunks in a file system. Each storage node performs read and write management on each data chunk stored in the respective storage node. Different service applications in multiple computing nodes or different service applications in a same computing node can share resources of the multiple storage nodes. In other words, different service applications can build corresponding logical volumes on a basis of the multiple storage nodes, i.e., each logical volume corresponding to at least a part of resources of the multiple storage nodes. In addition, each storage node maintains log information of multiple logical volumes of a shared file system.

For example, the log information can be maintained by deploying a logical volume service process in each storage node. Based on this file system, when any service application in any computing node needs to access data and triggers a mounting request for a certain logical volume (which is called a target logical volume) to any storage node (which is called a target storage node), the target storage node obtains a log segment list and a checkpoint list corresponding to the target logical volume. The log segment list stores metadata of various logs of the target logical volume. Therefore, the computing node can restore the most recent data state of the target logical volume in the memory based on the log segment list and the checkpoint list that are obtained. As such, the computing node can perform data access processing such as data writing or data reading based on the most recent data state of the target logical volume. In a distributed file system composed of the above-mentioned computing nodes and storage nodes, when multiple computing nodes perform accesses to the target logical volume (for example, when multiple computing nodes need to read and write data corresponding to the target logical volume), the multiple computing nodes can maintain good read and write consistency based on log information of the target logical volume maintained in the storage nodes, and can perform reading and writing synchronously, thus avoiding read and write conflicts.

BRIEF DESCRIPTION OF THE DRAWINGS

In order to explain technical solutions of the embodiments of the present disclosure more clearly, the drawings that are required for describing the embodiments are briefly described herein. Apparently, the drawings described herein represent some embodiments of the present disclosure. For one of ordinary skill in the art, other drawings can be obtained based on these drawings without making any creative effort.

FIG. 5a is a flowchart of an implementation process of step 404a in the embodiments as shown in FIG. 4a.

FIG. 7a is a flowchart of an implementation process of step 604a in the embodiments shown in FIG. 6a.

DETAILED DESCRIPTION

Figure 1:
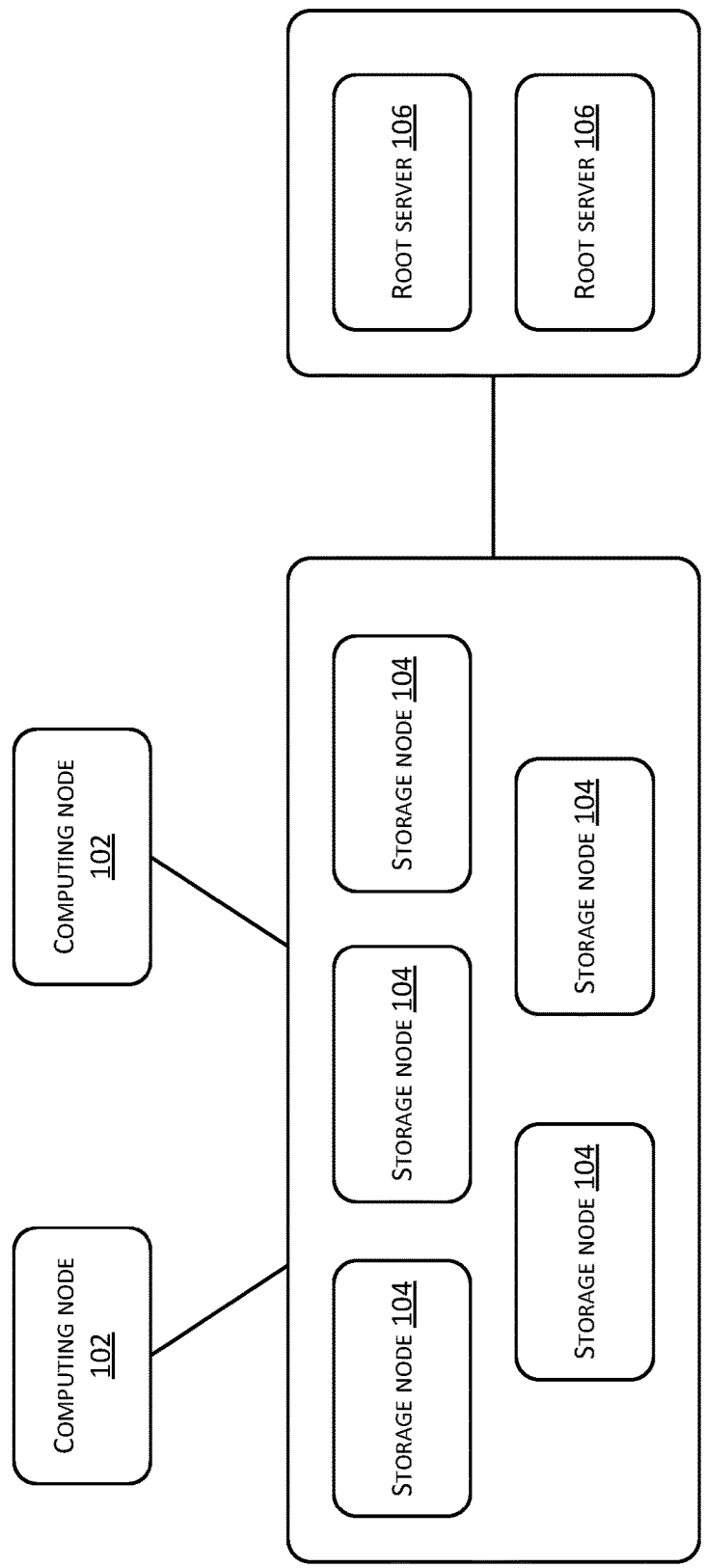
FIG. 1 is an architecture diagram of a file system provided by the embodiments of the present disclosure.

In order to make the objectives, technical solutions, and advantages of the embodiments of the present disclosure clearer, the technical solutions in the embodiments of the present disclosure will be described clearly and completely in conjunction with the accompanying drawings in the embodiments of the present disclosure. Apparently, the described embodiments represent some and not all of the embodiments of the present disclosure. Based on these embodiments of the present disclosure, all other embodiments obtained by one of ordinary skill in the art without making any creative effort shall fall within the scope of protection of the present disclosure.

Terms used in the embodiments of the present disclosure are intended for the purpose of describing specific embodiments only, and are not intended to limit the present disclosure. Singular forms of "a", "said" and "the" used in the embodiments of the present disclosure and the appended claims are also intended to include plural forms. Unless other meanings are clearly indicated in the context, "multiple" generally includes at least two, but does not exclude an inclusion of at least one.

It should be understood that a term "and/or" used in this text is merely an association relationship describing associated objects, and means that three types of relationships may exist. For example, A and/or B may mean three types of situations: A exists alone, and both A and B exist, B exists alone. In addition, a symbol "/" in this text generally represents that associated objects before and after thereof are in an "or" relationship.

It should be understood that, although terms, such as first, second, third, etc., may be used to describe XXX in the embodiments of the present disclosure, these XXX should not be limited to these terms. These terms are only used to distinguish XXX. For example, without departing from the scope of the embodiments of the present disclosure, a first XXX may also be referred to as a second XXX, and similarly, the second XXX may also be referred to as the first XXX.

Depending on the context, words "if" and "in case" as used herein can be interpreted as "at the time when" or "when" or "in response to determining that" or "in response to detecting that". Similarly, depending on the context, phrases "if determining" or "if detecting (a described condition or event)" can be interpreted as "when determining" or "in response to determining that" or "when detecting (a described condition or event)" or "in response to detecting (a described condition or event)".

It should also be noted that the terms "including", "containing" or any other variants thereof are intended to cover a non-exclusive inclusion, so that a product or system that includes a series of elements not only includes those elements, but also includes other elements that are not explicitly listed, or also include elements that are inherent to such product or system. Without any further limitations, an element defined by a sentence "including a . . . " does not exclude an existence of other identical elements in a product or system that includes such element.

In addition, step sequences in the following method embodiments are only examples, and are not strictly limited.

FIG. 1 is an architecture diagram of a file system 100 provided by the embodiments of the present disclosure. The file system 100 may be a distributed file system. As shown in FIG. 1, the file system 100 may include at least one computing node 102, multiple storage nodes 104, and multiple root servers 106 (RS, an abbreviation of root server) that are configured to manage the multiple storage nodes 104.

A computing node often corresponds to an application server, in which one or more service applications are deployed.

The multiple storage nodes often correspond to storage servers deployed in different geographical locations, and multiple computing nodes can share storage resources of the multiple storage nodes. In each storage node, data is read and written in units of chunks, and each chunk is preset to a certain size.

Sharing of a file system by multiple computing nodes is mainly embodied in that different users can create logical volumes for service applications in respective computing nodes based on storage resources provided by multiple storage nodes of the file system. A logical volume can be considered as a logical file system created on a basis of a physical file system. Different logical volumes correspond to different storage resources in the multiple storage nodes, i.e., different logical volumes occupying different storage resources. Generally, each logical volume corresponds to a part of storage resources in the multiple storage nodes. However, when the multiple storage nodes are only used by a certain service application, a logical volume corresponding to such service application can correspond to all the storage resources of the multiple storage nodes. Therefore, each logical volume can be considered to correspond to at least a part of the storage resources in the multiple storage nodes.

Multiple RSs are in a mutual backup relationship, where stored content is the same. The stored content is mainly a correspondence relationship between data chunk identifier(s) and storage node identifier(s). In other words, each RS knows what data chunks are stored on each storage node. In practical applications, for each storage node, a data chunk service process running therein performs actual data read and write processing of the respective storage node, and the data chunk service process has a one-to-one correspondence with the storage node. Therefore, it can also be considered that a root server maintains a correspondence relationship between data chunk identifier(s) and data chunk service process identifier(s).

Management of multiple storage nodes by any root server is not only reflected in the above-mentioned maintenance of the correspondence relationship between the data chunk identifier(s) and the storage node identifier(s)/data chunk service process identifier(s), in practical applications, any root server can also record information, such as all targets and file spaces of the file system, and a data chunk list of each file, etc. Furthermore, distribution and scheduling of storage nodes can also be performed according to a storage load of each storage node.

In practical applications, if a certain service application in any computing node of the at least one computing node needs to perform a data access, such as writing new service data or reading service data, a data access process is activated to trigger a data access process of a corresponding logical volume (called a target logical volume). Such data access process can be a data writing process or a data reading process.

At this point, during a process of accessing data of a target logical volume:

The any computing node is configured to send a mounting request triggered for a target logical volume to any storage node of the multiple storage nodes (hereinafter referred to as a target storage node), receive storage location information of a log segment and a checkpoint corresponding to the target logical volume sent by the target storage node, read log metadata of the log segment and the checkpoint according to the storage location information of the log segment and the checkpoint to restore a data state of the target logical volume, and perform data access processing based on the data state of the target logical volume.

The target storage node is configured to obtain storage location information of the log segment and the checkpoint corresponding to the target logical volume, and send the storage location information of the log segment and the checkpoint to the any computing node.

The target logical volume corresponds to multiple log segments and checkpoints, the log segments and the checkpoints having correspondence relationships. For example, a checkpoint (1000) is generated after a log segment [1-1000]. Each log segment contains multiple pieces of logs. A log consists of data and metadata, and some logs may only contain metadata. Simply put, the metadata records related information about data accesses that were performed to various files corresponding to the target logical volume, such as who has performed a read/write access on data in which file at what time. In addition to the above-mentioned data access related information, the metadata also includes a log serial number. Based on the log serial number, read and write consistency of data can be ensured, which will be described in subsequent embodiments.

In addition, each log segment corresponds to a checkpoint, which is used for restoring data based on the checkpoint when the file system is abnormal. It is for the purpose of quickly restoring from exceptions of the file system based on logs that the logs are organized in a form of log segments.

In the embodiments of the present disclosure, since the multiple storage nodes can be shared by multiple service applications, for any service application, the multiple storage nodes are regarded as a whole without specific distinctions being made. Therefore, when any computing node needs to issue a mounting request for a corresponding target logical volume based on triggering by a certain service application therein, the any computing node can send the mounting request to any storage node to request for mounting the target logic volume. Based thereon, each storage node maintains storage location information of respective log segments and respective checkpoints corresponding to each logical volume, and the storage location information describes in which data chunks each log segment and each checkpoint are located.

It is understandable that a storage node may forward a mounting request to other storage nodes for processing if the storage node that currently receives the mounting request cannot respond to the mounting request due to high load pressure or other reasons.

Upon receiving the mounting request sent by the aforementioned computing node, the target storage node knows which logical volume is requested to be mounted according to an identifier of the target logical volume included in the mounting request, and thus obtains and returns storage location information of a log segment and a checkpoint corresponding to the target logical volume to the computing node from among storage location information of log segments and checkpoints of each logical volume that is locally maintained. The computing node then reads corresponding log metadata from a corresponding storage location according to the obtained storage location information of the log segment and the checkpoint to restore a data state of the target logical volume. Specifically, the computing node replays the log metadata of the log segment and the checkpoint in the memory to restore the data state of the target logical volume. This data state reflects the latest data state of the target logical volume, i.e., reflecting the latest state of data in each file corresponding to the target logical volume up to the current moment. Based thereon, the computing node can perform subsequent data access processing, such as processing of data writing and data reading. A process of the data access processing will be described in detail in subsequent method embodiments, which is not described in detail in the present embodiment.

It is worth noting that the above-mentioned maintenance of the storage location information of the log segments and checkpoints by the target storage node can be embodied as maintaining correspondence relationships between identifiers of each log segment and each checkpoint, and data chunk identifiers of the storage node, such as recording a log segment [0-2000] on chunk1, a log segment [2001-2200] on chunk2, and a checkpoint (2000) on chunk7. Therefore, in an optional embodiment, the target storage node may also obtain corresponding metadata of the log segment and the checkpoint from corresponding data chunks of various storage nodes based on such correspondence relationships and return thereof to the computing node.

It is worth noting that the log segment and the checkpoint corresponding to the target logical volume sent by the target storage node to the computing node may be, but not limited to, storage location information of the last log segment and the last checkpoint of the target logical volume. It is because, under general circumstances, only the checkpoint (2000) is needed to be read, and metadata of each log in the log segment [2001-2200] is needed to be replayed when restoring the latest data state of the target logical volume, based on the above example of log segment and checkpoint. It is because the checkpoint (2000) records the data state of the target logical volume before the log segment [2001-2200].

In addition, it is worth noting that a computing node first needs to mount a target logical volume locally to perform subsequent access in order to access the target logical volume. However, in the embodiments of the present disclosure, during a process of mounting the target logical volume, the most recent data state of the target logical volume is restored based on log segment and checkpoint information of each logical volume maintained in each storage node. As such, each computing node can obtain the most recent data state of the target logical volume to ensure read and write consistency when multiple computing node access the target logical volume.

The architecture shown in FIG. 1 above is an introduction from the perspective of a hardware physical node. In practice, in order to support multiple computing nodes to share storage resources of multiple storage nodes, relevant software modules are deployed in each computing node and each storage node. Such software modules can be embodied as various types of service processes. Therefore, in conjunction with the embodiments as shown in FIG. 2, a detailed internal architecture of a file system 200 provided by the embodiments of the present disclosure is further introduced hereinafter.

Figure 2:
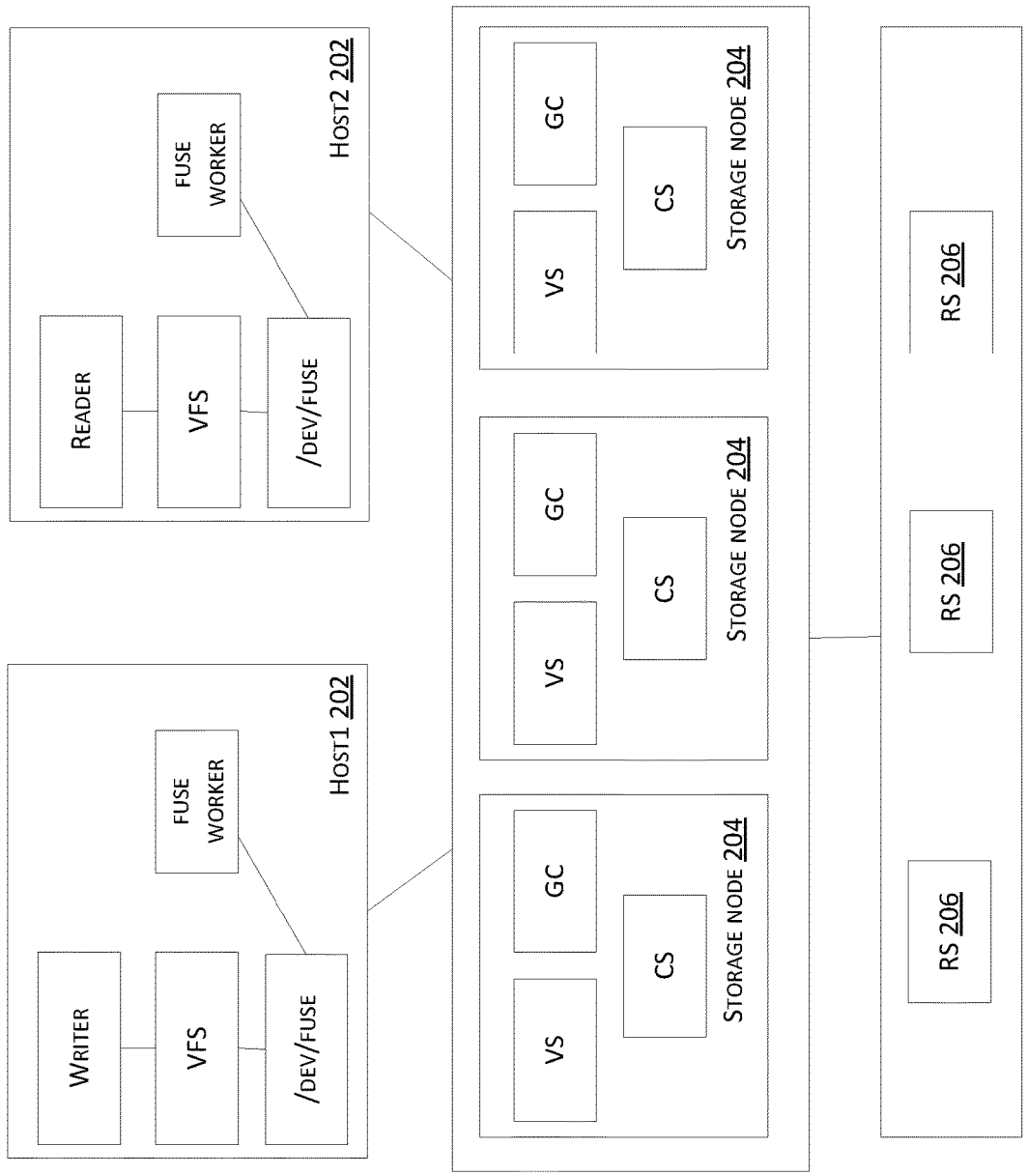
FIG. 2 is an architecture diagram of another file system provided by the embodiments of the present disclosure.

As shown in FIG. 2, the file system 200 includes: at least one computing node 202 (host1 and host2 as shown in FIG. 2), multiple storage nodes 204, and multiple root servers 206 (Root Server, which is abbreviated as RS) used for managing data chunk service process (Chunk Server, which is abbreviated as CS) of the multiple storage nodes 204.

Each computing node has a data access process and a file system access process.

Each storage node has a logical volume service process (Volume Server, which is abbreviated as VS) and CS. A CS is configured to perform read and write management of each data chunk (chunk) that is stored in a corresponding storage node.

In practical applications, a data access process in each computing node may be a data writing process (Writer) or a data reading process (Reader) as shown in FIG. 2. The data access process is usually initiated by a service application in a computing node.

A file system access process in each computing node is an access port for accessing a corresponding target logical volume. In practical applications, optionally, the file system access process may be a user-mode file system access process (fuse worker) that is implemented based on a user-mode file system (File system in User space, which is abbreviated as FUSE) in FIG. 2. VFS, /dev/fuse, and fuse worker are component modules of Fuse. It is worth noting that the file system access process may be implemented without relying on Fuse architecture, or related functions of fuse worker may be implemented in an operating system kernel similar to those such as Lustre/GPFS and other file systems.

In addition, in an optional embodiment, as shown in FIG. 2, each storage node also includes a garbage collection service process (Garbage Collector, which is abbreviated as Fuse).

In summary, service processes of VS, GC, and CS can be deployed in each storage node.

Figure 3:
FIG. 3 is a logical layered architecture diagram corresponding to the file system shown in FIG. 2.

In addition, it is worth noting that, based on the foregoing composition of computing nodes, storage nodes, and root servers, the file system provided by the embodiments of the present disclosure can be regarded as having a logically hierarchical structure. FIG. 3 illustrates such hierarchical structure in a more intuitive way, where the number of VS, GC, and CS shown in FIG. 3 is only used for illustrating this hierarchical structure, and does not manifest a corresponding relationship with storage nodes, because these service processes and storage nodes are generally in one-to-one correspondence. As can be seen from FIG. 3, a file system 300 can be regarded as a three-layer structure including a top layer (a file system interface layer 302), a middle layer (a volume service layer 304), and a bottom layer (a data chunk service layer 306).

The bottom layer is a data chunk service (chunk service) layer, which provides distributed chunk read and write services upward in an append-only mode. A user is able to create chunks, specify the number of copies, write data in an append-only mode, consistently read the successfully written data in real time, and specify a part of chunk data to be cached in memory or high-speed media to accelerate data read. The chunk service layer is mainly composed of two roles: one is CS, which is used to manage all chunk information in a corresponding storage node and provides chunk read and write services; and another is RS, which is used to manage all CSs, i.e., CSs in all storage nodes, and is able to maintain correspondence relationships between CS identifiers and chunk identifiers.

The middle layer is a volume service layer, which provides services for creating/deleting/mounting/un-mounting logical volumes upward, and consists of two roles: one is VS, which is used to manage metadata of each logical volume and primarily includes maintenance of log segments of each logical volume and information of storage locations in which checkpoints are located to accelerate log recovery; another is GC, which is used to reclaim a garbage space of the file system, and regularly produces checkpoints to speed up a recovery process of the file system.

The top layer is a file system access layer, which includes two parts: one is a data access process (such as Writer/Reader) to access file data by calling a standard Posix interface; another is a user-mode file system (Fuse) that includes a file system access process (fuse worker), based on the Fuse framework, and provides fuse worker to perform management, reading and writing of user-mode file systems.

In summary, in the file system architectures as shown in FIGS. 2 and 3, when a certain service application in any computing node starts a data access process and needs to access a target logical volume corresponding to the service application, a mount operation is triggered. At this time:

In response to the mount operation triggered by the data access process in the computing node, a file system access process in the computing node sends a mounting request for the target logical volume to a logical volume service process in any storage node, receives storage location information of a first log segment and a checkpoint corresponding to the target logical volume from the logical volume service process, and thereby reads log metadata of the first log segment and the checkpoint according to the storage location information of the first log segment and the checkpoint to restore a data state of the target logical volume, to perform data access processing based on the data state of the target logical volume; and the logical volume service process is configured to receive the mounting request sent by the file system access process, and send the storage location information of the first log segment and the checkpoint corresponding to the target logical volume to the file system access process.

Optionally, the first log segment and the checkpoint may be the last log segment and the last checkpoint of the target logical volume at the current moment.

As can be seen from above, a logical volume service process is deployed in each storage node, and the logical volume service process maintains storage location information of log segment(s) and checkpoint(s) corresponding to each logical volume. The logical volume service process can be started when the storage node starts. In addition, logical volume service processes of different storage nodes have a mutual backup relationship to ensure that the logical volume service process of each storage node maintains storage location information of log segments and checkpoints of all logical volumes.

In the above-mentioned distributed file system, when multiple computing nodes are accessing a target logical volume (for example, when multiple computing nodes need to read and write data corresponding to the target logical volume), multiple computing nodes are allowed to maintain good read and write consistency based on log information of the target logical volume maintained in each storage node, and are able to perform reading and writing synchronously, thus avoiding read and write conflicts.

A method for accessing data of a file system is described herein in detail with reference to the file system architectures shown in FIGS. 1 to 3.

A complete process of data writing is introduced hereinafter with reference to the embodiments as shown in FIGS. 4a to 5b.

Figure 4A:
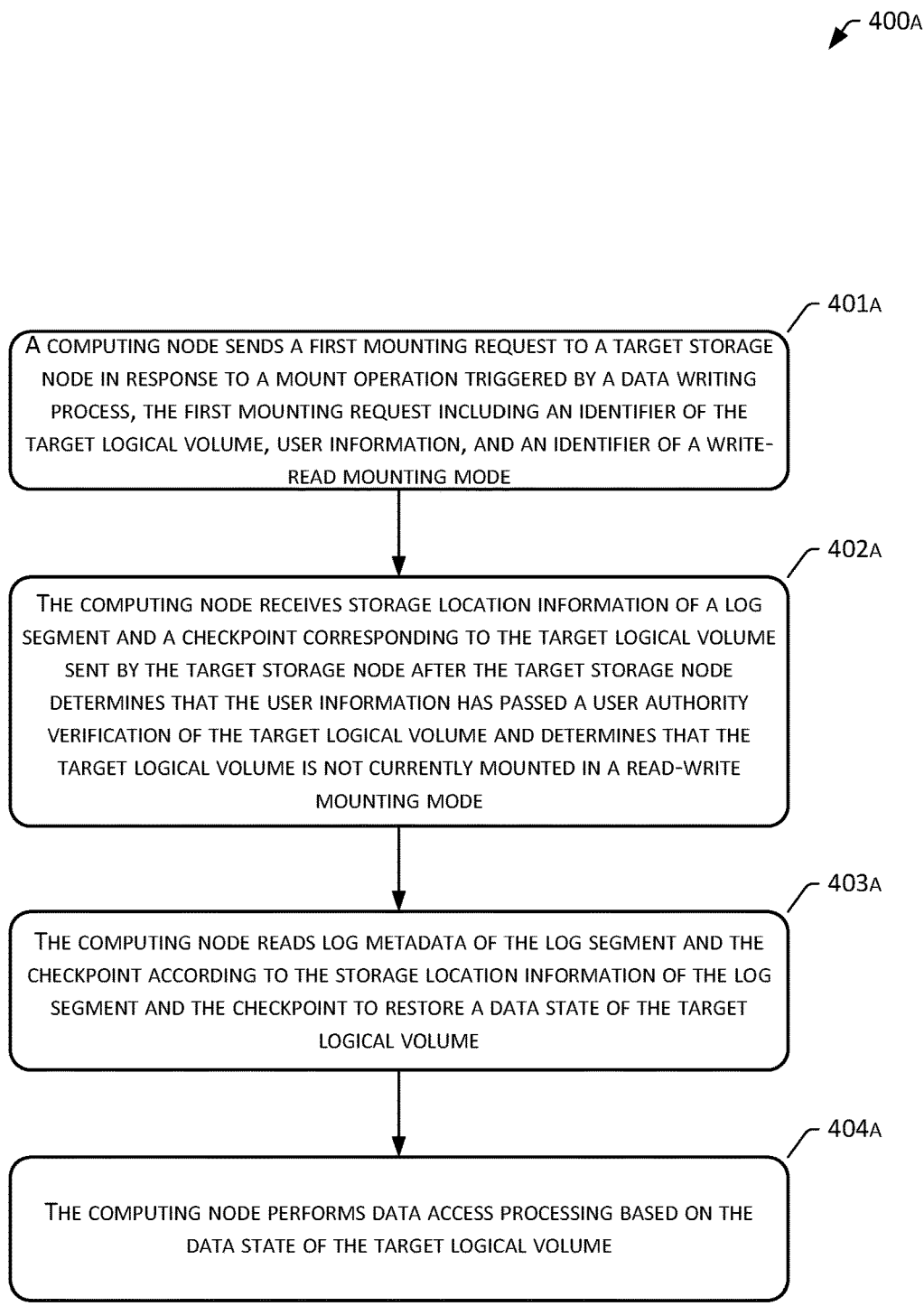
FIG. 4a is a flowchart of a method for accessing data of a file system according to the embodiments of the present disclosure.

FIG. 4a is a flowchart of a method 400a for accessing data of a file system provided by the embodiments of the present disclosure. The method provided by the embodiments of the present disclosure may be executed by a computing node under the architecture as shown in FIG. 1. As shown in FIG. 4a, the method 400a includes the following steps:

401a: A computing node sends a first mounting request to a target storage node in response to a mount operation triggered by a data writing process, the first mounting request including an identifier of the target logical volume, user information, and an identifier of a write-read mounting mode.

As can be seen from the embodiments shown in FIG. 1, the target storage node is any one of multiple storage nodes.

The present embodiment introduces a situation where a service application in a certain computing node needs to perform data writing processing. Therefore, the service application starts a data writing process in the computing node. As can be seen from the foregoing description of the present embodiment, when a target logical volume corresponding to the service application needs to be accessed, the target logical volume needs to be mounted locally on the computing node. Therefore, the present embodiment first introduces a process of mounting a target logical volume in a data writing scenario.

After the data writing process in the computing node is started, the data writing process triggers a mounting operation. The mounting operation may be regarded a mounting notification sent by the data writing process to a processor of the computing node. Based on the mounting operation, the computing node sends a first mounting request including an identifier of a target logical volume, user information, and an identifier of a write-read mounting mode to any storage node that is called a target storage node.

The user information may be information such as a user account, a user name, etc. The identifier of the readable-writable mounting mode corresponds to the data writing process. In other words, in the embodiments of the present disclosure, the data writing process is allowed to mount a logical volume in a write-read mode. This read-write mounting mode means that, for a same target logical volume, only one data writing process can be allowed to write data at the same time.

402a: The computing node receives storage location information of a log segment and a checkpoint corresponding to the target logical volume sent by the target storage node after the target storage node determines that the user information has passed a user authority verification of the target logical volume and determines that the target logical volume is not currently mounted in a read-write mounting mode.

After receiving the first mounting request from the computing node, the target storage node knows that the data writing process needs to access the target logical volume at this time based on the identifier of the read-write mounting mode. At this time, on the one hand, the target storage node verifies whether a user has the permission to access the target logical volume based on the user information in the first mounting request. On the other hand, the target storage node needs to determine whether the target logical volume is currently occupied by other data writing processes, i.e., whether the target logical volume is currently mounted in a read-write mounting mode.

In practical applications, optionally, each storage node can maintain user permission information of each logical volume, such as a user whitelist for implementing user authority verification. In addition, each storage node synchronizes mount state information of each logical volume with each other, i.e., related information about each logical volume what type of mounting mode it is mounted or if it is not mounted. Based thereon, a determination about whether the target logical volume is currently mounted in the read-write mounting mode can be realized.

Upon determining that the user has passed the permission verification, and determines that the target logical volume is not currently mounted in a read-write mode, the target storage node can return storage location information of a log segment and a checkpoint corresponding to the target logical volume to the computing node.

403a: The computing node reads log metadata of the log segment and the checkpoint according to the storage location information of the log segment and the checkpoint to restore a data state of the target logical volume.

The computing node reads each log from a corresponding storage location according to the storage location information, which is specifically reading metadata in the log, so that each piece of metadata is sequentially played back in the memory until the log with the last log serial number i is reached, to restore the latest data state of the target logical volume.

404a: The computing node performs data access processing based on the data state of the target logical volume.

Figure 5A:
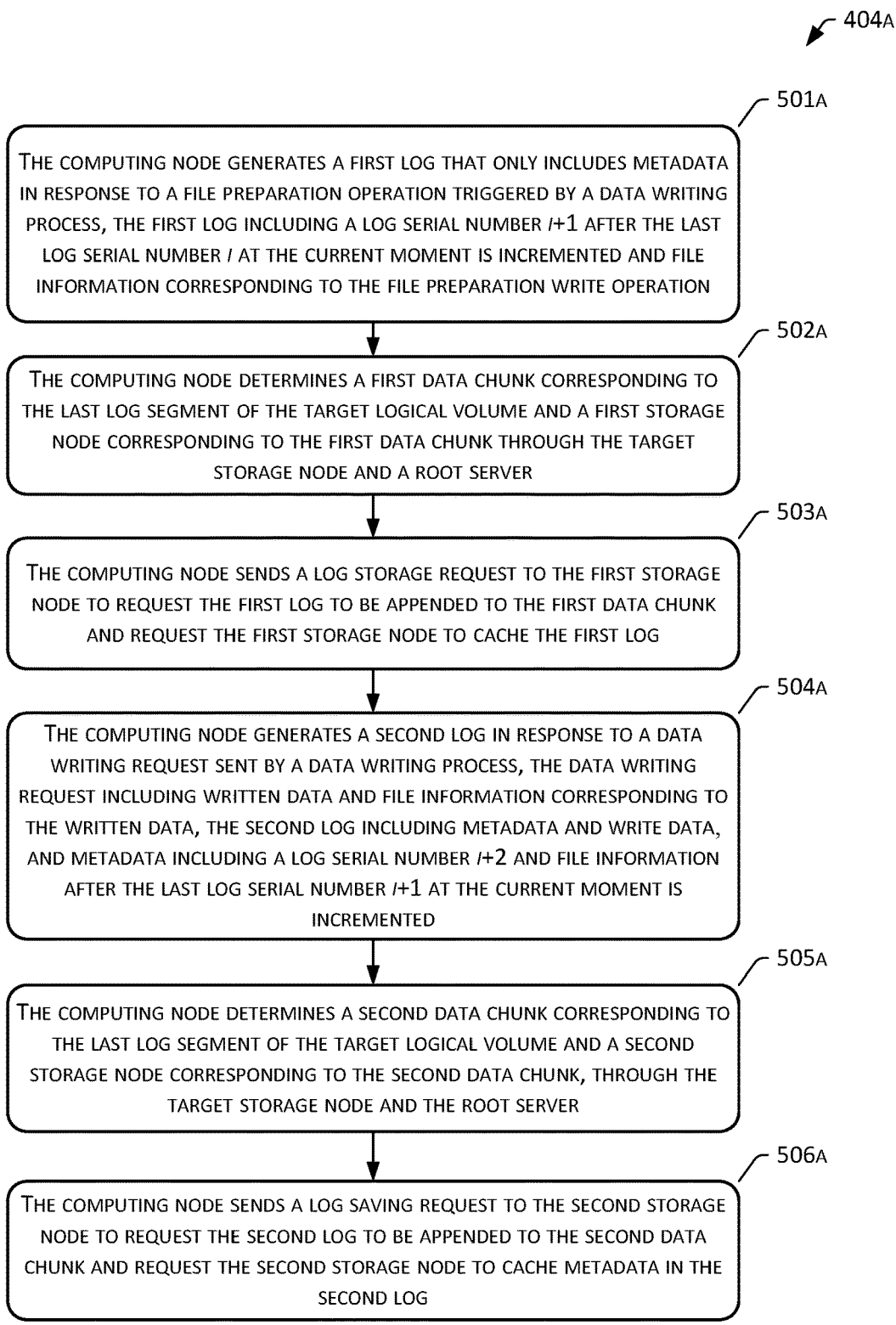

After restoring the latest data state of the target logical volume, the computing node can perform a subsequent data writing process. The data writing process often includes a file preparation phase and a data writing phase, which are described in the subsequent embodiments as shown in FIG. 5a.

The foregoing embodiments as shown in FIG. 4a are described in terms of roles of nodes or devices of computing nodes and storage nodes. A process of implementing the method for accessing data of a file system provided by the embodiments of the present disclosure is described hereinafter based on the logical system architecture as shown in FIG. 2 or FIG. 3 in conjunction with the embodiments as shown in FIG. 4b.

Figure 4B:
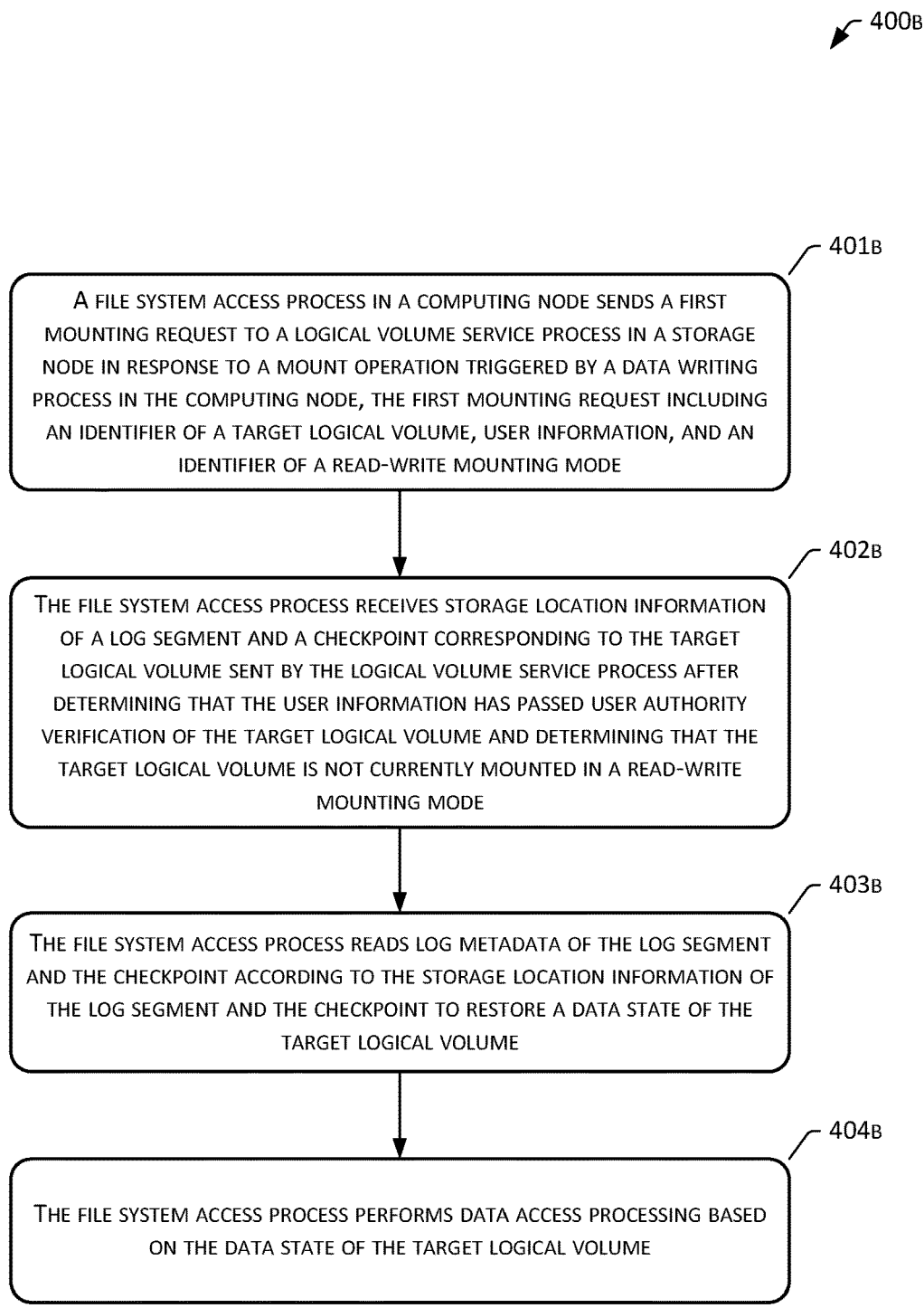
FIG. 4b is a flowchart of another file system data access method provided by the embodiments of the present disclosure.

FIG. 4b is a flowchart of another method 400b for accessing data of a file system provided by the embodiments of the present disclosure. The method provided by the embodiments of the present disclosure can be implemented by a file system access process (fuse worker) in a computing node under the architecture shown in FIG. 2 or FIG. 3. As shown in FIG. 4b, the method 400b includes the following steps:

401b: A file system access process in a computing node sends a first mounting request to a logical volume service process in a storage node in response to a mount operation triggered by a data writing process in the computing node, the first mounting request including an identifier of a target logical volume, user information, and an identifier of a read-write mounting mode.

In the present embodiment, the computing node is any one of multiple computing nodes in a file system, and the storage node is any one of multiple storage nodes. In order to realize accessing a corresponding logical volume by the computing node, a file system access process is deployed in the computing node, which is for example, but is not limited to, a fuse worker as shown in FIG. 2 or FIG. 3.

In addition, a logical volume service process and a data chunk service process are deployed in each storage node. A data chunk service process is used to read and write data chunks in a corresponding storage node, and a logical volume service process maintains each correspondence relationships between log segment identifiers/checkpoint identifiers and data chunk identifiers of each logical volume, and assist the file system access process for performing data read and write processing.

In practical applications, when a service application in a computing node triggers a data writing process and wants to write data to a target logical volume, the data writing process triggers a mount operation, such as sending a first mounting request to the file system access process in the computing node. The file system access process thereby sends the first mounting request to the logical volume service process. Optionally, the file system access process and the logical volume service process may perform interactions based on an inter-process communication mechanism.

As can be seen from the introduction in the foregoing embodiments, the first mounting request is used for requesting the logical volume service process to mount the target logical volume in a write-read mounting mode. The read-write mounting mode means that only one data writing process can be allowed to write data for the same target logical volume at the same time.

402b: The file system access process receives storage location information of a log segment and a checkpoint corresponding to the target logical volume sent by the logical volume service process after determining that the user information has passed user authority verification of the target logical volume and determining that the target logical volume is not currently mounted in a read-write mounting mode.

Since logical volume service processes in each storage node have a mutual backup relationship, each logical volume service process maintains identifiers of log segments of each logical volume and correspondence relationships between identifiers of checkpoints and identifiers of data chunks. Therefore, a logical volume service process that receives the first mounting request obtains storage location information of a log segment and a checkpoint corresponding to the target logical volume based on the identifier of the target logical volume therein and the correspondence relationships, i.e., data chunk identifiers corresponding to the log segment and the checkpoint.

As can be seen from the description of the foregoing embodiments, at this time, optionally, the logical volume service process can return data chunk identifiers corresponding to the last log segment and the last checkpoint of the target logical volume to the file system access process, so that the file system access process restores the latest data state of the target logical volume based on the last log segment and the last checkpoint.

403b: The file system access process reads log metadata of the log segment and the checkpoint according to the storage location information of the log segment and the checkpoint to restore a data state of the target logical volume.

Optionally, the file system access process can query any root server with the data chunk identifiers obtained from the logical volume service process to obtain data chunk service process identifier(s) corresponding to the data chunk identifiers, and thereby read metadata of logs stored in data chunks corresponding to the data chunk identifiers through data chunk service process(es) corresponding to the data chunk service process identifier(s).

Alternatively, optionally, the logical volume service process may also query the root server based on the determined data chunk identifiers to obtain data chunk service process identifier(s) corresponding to the data chunk identifiers, and return the data chunk identifiers and the data chunk service process identifier(s) to the file system access process, so that the file system access process reads the metadata of the logs stored in the data chunks corresponding to the data chunk identifiers through the data chunk service process(es) corresponding to the data chunk service process identifier(s).

404b: The file system access process performs data access processing based on the data state of the target logical volume.

Figure 5B:
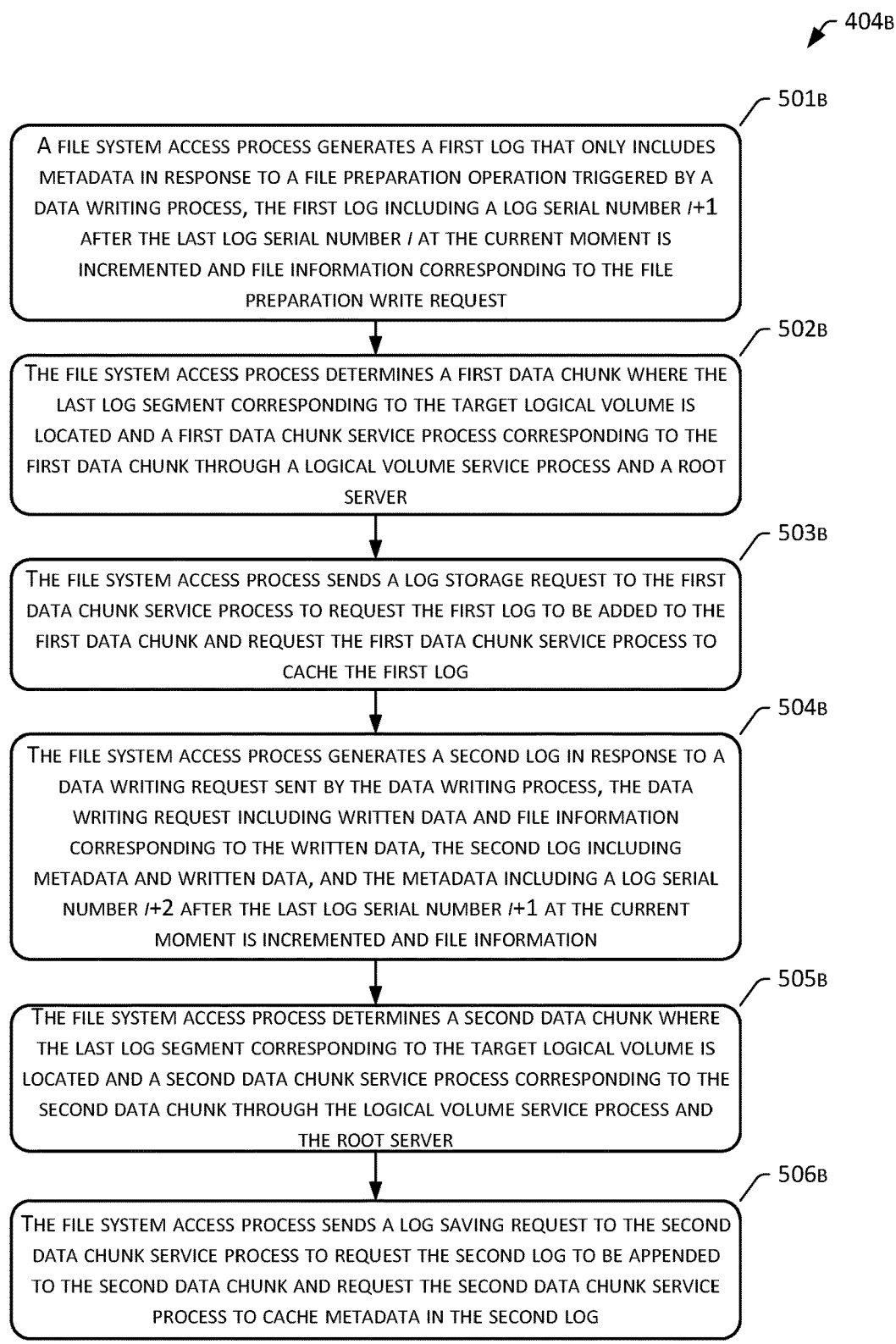
FIG. 5b is a flowchart of an implementation process of step 404b in the embodiments shown in FIG. 4b.

After the file system access process restores the latest data state of the target logical volume, a subsequent data writing process can be performed. The data writing process often includes a file preparation phase and a data write phase, which are described in subsequent embodiments as shown in FIG. 5b.

FIG. 5a is a flowchart of an implementation process of step 404a in the embodiments shown in FIG. 4a. As shown in FIG. 5a, step 404a may specifically include the following specific steps.

501a: The computing node generates a first log that only includes metadata in response to a file preparation operation triggered by a data writing process, the first log including a log serial number i+1 after the last log serial number i at the current moment is incremented and file information corresponding to the file preparation write operation.

Before actually performing data writing, the data writing process often needs to perform some preparation operation. Such preparation operation is called a file preparation operation. In practical applications, the file preparation operation may be, for example, opening a certain file, or creating and opening a certain file. In the present embodiment, a process of preparing a file for writing is first introduced.

The data writing process can trigger the above-mentioned file preparation operation by invoking a corresponding file preparation interface. At this time, the computing node generates a log record (which is called a first log) corresponding to the file preparation operation. Since the data writing process has not yet written any real data at this time, the first log only includes metadata. The metadata includes a log serial number i+1 after the last log serial number i at the current moment is incremented and file information corresponding to the file preparation write operation. The file information includes, for example, a file name of a created or opened file and a file identifier descriptor (which is abbreviated as FID). If the last log serial number in the log segment of the target logical volume is i in the embodiments as shown in FIG. 4a, the log serial number of the first log increases by one to i+1.

502a: The computing node determines a first data chunk corresponding to the last log segment of the target logical volume and a first storage node corresponding to the first data chunk through the target storage node and a root server.

As mentioned in the foregoing embodiments, data is stored in chunks in a storage node. Furthermore, data is written in an append-only mode, and data that is actually written is included in a log. Therefore, a log generated by a computing node is to be stored in a data chunk of a storage node in an append-only mode. As such, it is necessary to determine a storage location where the last log segment of the target logical volume is located, i.e., a data chunk where the last log segment is located and a storage node corresponding to that data chunk.

As mentioned above, in the embodiments of the present disclosure, each storage node maintains storage location information of log segments and checkpoints of each logical volume. The storage location information is mainly correspondence relationships between log segment identifiers/checkpoint identifiers and data chunk identifiers. Therefore, the computing node can obtain a data chunk identifier described in the last log segment of the target logical volume through the target storage node. Based on the data chunk identifier, the computing node can further query a root server to obtain an identifier of a storage node corresponding to the chunk identifier from the root server, wherein the root server maintains correspondence relationships between identifiers of various storage nodes and various data chunk identifiers.

Therefore, the computing node can obtain a first data chunk where the last log segment is located and a first storage node corresponding to the first data chunk through the following process:

sending, by the computing node, a first query request used for querying a data chunk where the last log segment corresponding to the target logical volume is located to the target storage node;

receiving, by the computing node, an identifier of the first data chunk sent by the target storage node, wherein the identifier of the first data chunk is determined by the target storage node according to maintained correspondence relationships between identifiers of log segments of the target logical volume and identifiers of data chunks;

sending, by the computing node, a second query request to the root server used for querying a storage node corresponding to the identifier of the first data chunk; and receiving, by the computing node, an identifier of a first storage node sent by the root server, wherein the identifier of the first storage node is determined by the root server according to the maintained correspondence relationships between identifiers of data chunks and identifiers of storage nodes.

503a: The computing node sends a log storage request to the first storage node to request the first log to be appended to the first data chunk and request the first storage node to cache the first log.

After determining the first data chunk and the first storage node, the computing node may send the first log to the first storage node, so that the first storage node appends the first log to the first data chunk and stores the first log in a cache, so that a subsequent data reading process (reader) can quickly read the first log.

After the first storage node is successfully stored, a confirmation notification may be returned to the computing node to inform the computing node that the storage is successful.

The above steps introduce a procedure of processing during a stage of file preparation writing operation before data writing. After the file preparation writing process is completed, the data writing process can perform a real data writing process, as shown in the following steps:

504a: The computing node generates a second log in response to a data writing request sent by a data writing process, the data writing request including written data and file information corresponding to the written data, the second log including metadata and write data, and metadata including a log serial number i+2 and file information after the last log serial number i+1 at the current moment is incremented.

505a: The computing node determines a second data chunk corresponding to the last log segment of the target logical volume and a second storage node corresponding to the second data chunk, through the target storage node and the root server.

506a: The computing node sends a log saving request to the second storage node to request the second log to be appended to the second data chunk and request the second storage node to cache metadata in the second log.

The data writing process can trigger the above data writing request by calling a standard data writing interface. The data writing request includes not only specific data to be written, but also file information corresponding to the written data. The file information includes, for example, a file FID, a writing position (offset) and a data length (length) of the written data in a file, a data location pointer, etc.

At this time, the computing node generates a second log used for recording the data write operation of the computing node. The second log is composed of metadata and data. The data is the written data of the computing node. The metadata includes a log serial number i+2 after the last log serial number i+1 at the current moment is incremented and the above-mentioned file information. Furthermore, the computing node needs to store the generated second log in a storage node. Specifically, the second log needs to be written into a data chunk where the last log segment of the target logical volume at the current moment is located. Therefore, the computing node needs to determine a second data chunk where the last log segment is located and a second storage node corresponding to the second data chunk through the target storage node and the root server, so as to send the second log to the second storage node, causing the second storage node to append the second log to the second data chunk and caches metadata of the second log in the memory. A process of determining the second data chunk and the second storage node can refer to the process of determining the first data chunk and the first storage node, which is not repeated herein.

It is worth noting that the second data chunk and the first data chunk are likely to be the same data chunk. Therefore, the second storage node and the first storage node may also be the same storage node. However, when the last log segment has met a closing condition before being stored in the second log, the second data chunk will be different from the first data chunk, though the second storage node may be the same as the first storage node.

Specifically, if the last log segment currently has reached the closing condition, the computing node closes the last log segment, generates a new checkpoint, and applies for a new log segment as the last log segment from the target storage node. The closing condition is the number of logs included in the last log segment reaching a preset number, or a data volume corresponding to the last log segment reaching a preset capacity value.

In practical applications, since checkpoints are used to accelerate a recovery of a file system when the file system is abnormal, and a checkpoint is generated after a log segment, the log segment is not appropriate to be too large. Specifically, the number of logs or a total amount of data in the logs included in a log segment is not appropriate to be too large. Otherwise the recovery rate of the file system will be affected. For example, each storage node records which log segments and checkpoints are stored on each chunk, such as a log segment [0-2000] on chunk1, a checkpoint (2000) on chunk7, and a log segment [2001-2200] on chunk2. If the file system is abnormal at some point after the log segment [2001-2200], only the checkpoint (2000) needs to be read at this time, and the log segment [2001-2200] is played back to restore the latest state of a corresponding logical volume.

In the present embodiment, if the last log segment at the current moment after adding the second log is [1500-2500], i.e., the log serial number of the second log is 2500, and if the last log segment currently has reached the closing condition, the computing node closes the log segment [1500-2500], generate a checkpoint (2500), and request a new log segment as the last log segment from the target storage node. The new log segment starts with a log serial number 2501.

The requested new log segment corresponds to log(s) subsequently generated, and the log(s) subsequently stored in the new log segment needs to be stored in certain data chunk(s). Therefore, after the target storage node receiving the request of the computing node, the target storage node needs to allocate corresponding data chunk(s) for the new log segment. Specifically, since the root server is used to manage all storage nodes, including scheduling and allocating each storage node, the target storage node may request the root server to allocate data chunk(s) for storing subsequent logs corresponding to the new log segment. The root server can assign a storage node A to allocate the data chunk(s) according to respective storage loads of each storage node. If the storage node A allocates chunk5 to store corresponding subsequent logs of the new log segment, a correspondence relationship between the storage node A and chunk5 is maintained in the root server. At the same time, the root server returns the chunk5 to the target storage node, and the target storage node maintains a correspondence relationship between the new log segment and chunk5. The target storage node can synchronize the correspondence relationship with other storage nodes.

The foregoing embodiments shown in FIG. 5a are described from the perspective of computing nodes and storage nodes. Based on the logical system architecture shown in FIG. 2 or FIG. 3, and in conjunction with the embodiments shown in FIG. 5b, a specific implementation process of the data writing process that is shown in FIG. 5a is further illustrated hereinafter, when computing nodes and storage nodes possess the composition of internal service processes as shown in FIG. 2 or FIG. 3.

FIG. 5b is a flowchart of an implementation process of step 404b in the embodiments shown in FIG. 4b. As shown in FIG. 5b, step 404b may specifically include the following specific steps.

501b: A file system access process generates a first log that only includes metadata in response to a file preparation operation triggered by a data writing process, the first log including a log serial number i+1 after the last log serial number i at the current moment is incremented and file information corresponding to the file preparation write request.

502b: The file system access process determines a first data chunk where the last log segment corresponding to the target logical volume is located and a first data chunk service process corresponding to the first data chunk through a logical volume service process and a root server.

The root server is used to manage data chunk service processes in each storage node, and specifically maintain correspondence relationships between data chunk identifiers and data chunk service process identifiers in each storage node.

Specifically, the file system access process may determine the first data chunk and the first data chunk service process corresponding to the first data chunk through the following steps:

sending, by the file system access process, a first query request used for querying a data chunk where the last log segment corresponding to the target logical volume is located to the logical volume service process;

receiving, by the file system access process, an identifier of a first data chunk sent by the logical volume service process, the identifier of the first data chunk being determined by the logical volume service process according to maintained correspondence relationships between log segment identifiers and data chunk identifiers of the target logical volume;

sending, by the file system access process, a second query request used for querying a data chunk service process corresponding to the identifier of the first data chunk to the root server;

receiving, by the file system access process, an identifier of a first data chunk service process sent by the root server, and the identifier of the first data chunk service process being determined by the root server according to maintained correspondence relationships between data chunk identifiers and data chunk service process identifiers.

503b: The file system access process sends a log storage request to the first data chunk service process to request the first log to be added to the first data chunk and request the first data chunk service process to cache the first log.

The above three steps correspond to a file preparation phase. For further content, reference can be made to the introduction in the embodiments shown in FIG. 5a, which is not repeated herein. After the file preparation phase is completed, the data writing process can then execute the following steps of a process of data writing.

504b: The file system access process generates a second log in response to a data writing request sent by the data writing process, the data writing request including written data and file information corresponding to the written data, the second log including metadata and written data, and the metadata including a log serial number i+2 after the last log serial number i+1 at the current moment is incremented and file information.

505b: The file system access process determines a second data chunk where the last log segment corresponding to the target logical volume is located and a second data chunk service process corresponding to the second data chunk through the logical volume service process and the root server.

For determining the second data chunk and the second data chunk service process corresponding to the second data chunk, reference can be made to the process of determining the first data chunk and the first data chunk service process, which is not repeated herein.

506b: The file system access process sends a log saving request to the second data chunk service process to request the second log to be appended to the second data chunk and request the second data chunk service process to cache metadata in the second log.

For further content in the foregoing process of data writing, reference may be made to the introduction in the embodiments shown in FIG. 5a, which is not repeated herein.

It is worth noting that the logs generated during the process of file preparation and the process of data writing as described above are appended to the last log segment by means of appending. However, when the last log segment reaches the closing condition, the last log segment at the current moment needs to be closed, and a request for a new log segment as the last log segment needs to be made. Therefore, if the last log segment at the current moment reaches the closing condition, the file system access process closes the last log segment, generates a new checkpoint, and requests for the new log segment as the last log segment to the logical volume service process. The closing condition is the number of logs included in the last log segment reaching a preset number, or a data volume corresponding to the last log segment reaching a preset capacity value.

In response to receiving the request of the file system access process, the logical volume service process can optionally generate a new log segment on the one hand, and request the root server to allocate a corresponding data chunk and a data chunk service process for the new log segment on the other hand.

In summary, in the entire process of data writing, on the one hand, before data is written, a computing node can restore the latest status of a target logical volume based on metadata information of a logical volume maintained by each storage node, i.e., storage location information of log segments and checkpoints. On the other hand, during the process of data writing, logs are generated to record any operation performed by a data writing process and data that is written. Each log is numbered according to serial numbers, and each log is appended to the last log segment at the current moment in an append-only mode, so that read and write consistency can be achieved based on serial numbers of the logs.

In addition, in the process of data writing, metadata and data is submitted to a disk for storage once, i.e., the metadata and the data is included in the same log, the log is stored in a data chunk of the storage node, and the metadata is also cached in the memory. This may enable a subsequent data reading process to quickly pull the latest logs in batches to update a mirroring state of a local file system, i.e., to restore the latest data state of a target logical volume, and reduce a delay in reading.

A complete process of data reading is introduced hereinafter in conjunction with the embodiments shown in FIGS. 6a to 7b.

Figure 6A:
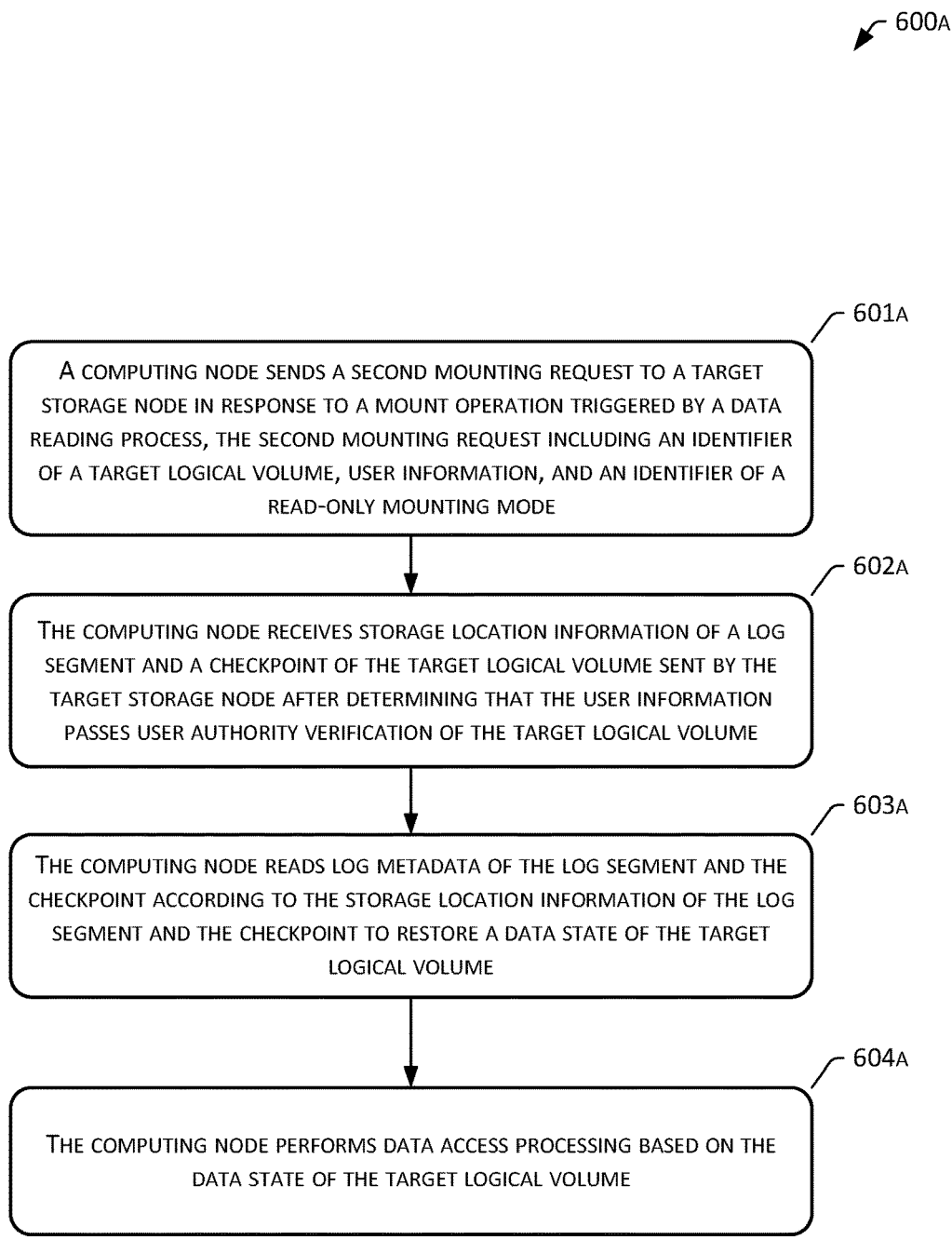
FIG. 6a is a flowchart of yet another method for accessing data of a file system according to the embodiments of the present disclosure.

FIG. 6a is a flowchart of another method 600a for accessing data of a file system provided by the embodiments of the present disclosure. The method provided by the embodiments of the present disclosure may be executed by a computing node under the architecture shown in FIG. 1. As shown in FIG. 6a, the following steps can be included.

601a: A computing node sends a second mounting request to a target storage node in response to a mount operation triggered by a data reading process, the second mounting request including an identifier of a target logical volume, user information, and an identifier of a read-only mounting mode.

As can be seen from the embodiments shown in FIG. 1, the target storage node is any one of multiple storage nodes.

The present embodiment introduces a situation where a service application in a computing node needs to perform data reading processing. Therefore, the service application starts a data reading process in the computing node. As can be seen from the description of the foregoing embodiments, when a target logical volume corresponding to the service application is needed to be accessed, the target logical volume needs to be mounted locally on the computing node.

Therefore, the present embodiment first introduces a process of mounting a target logical volume in a data reading scenario.

After the data reading process in the computing node is activated, the data reading process triggers a mount operation. The mount operation may be sending a mount notification by the data reading process to a processor of the computing node. Based on the mount operation, the computing node sends a second mounting request including an identifier of a target logical volume, user information, and an identifier of a read-only mounting mode to any storage node (which is called a target storage node).

The user information may be information such as a user account, a user name, etc. The identifier of a read-only mounting mode corresponds to the data reading process. In other words, in the embodiments of the present disclosure, the data reading process is allowed to mount a logical volume in a read-only mode. The read-only mounting mode means that, for a same target logical volume, multiple data reading processes are allowed to read data, but operations such as data modification, writing, etc., be performed.

602a: The computing node receives storage location information of a log segment and a checkpoint of the target logical volume sent by the target storage node after determining that the user information passes user authority verification of the target logical volume.

Different from the process of data writing, in the process of data reading, mounting a target logical volume only needs to satisfy verification of user permission, because the read-only mounting mode allows multiple data reading processes to read data at the same time.

603a: The computing node reads log metadata of the log segment and the checkpoint according to the storage location information of the log segment and the checkpoint to restore a data state of the target logical volume.

604a: The computing node performs data access processing based on the data state of the target logical volume.

For further description of the foregoing steps, reference may be made to the embodiments shown in FIG. 4a, which is not repeated herein. Through this mounting process, the computing node can access all data that is currently possessed by the target logical volume.

Figure 7A:
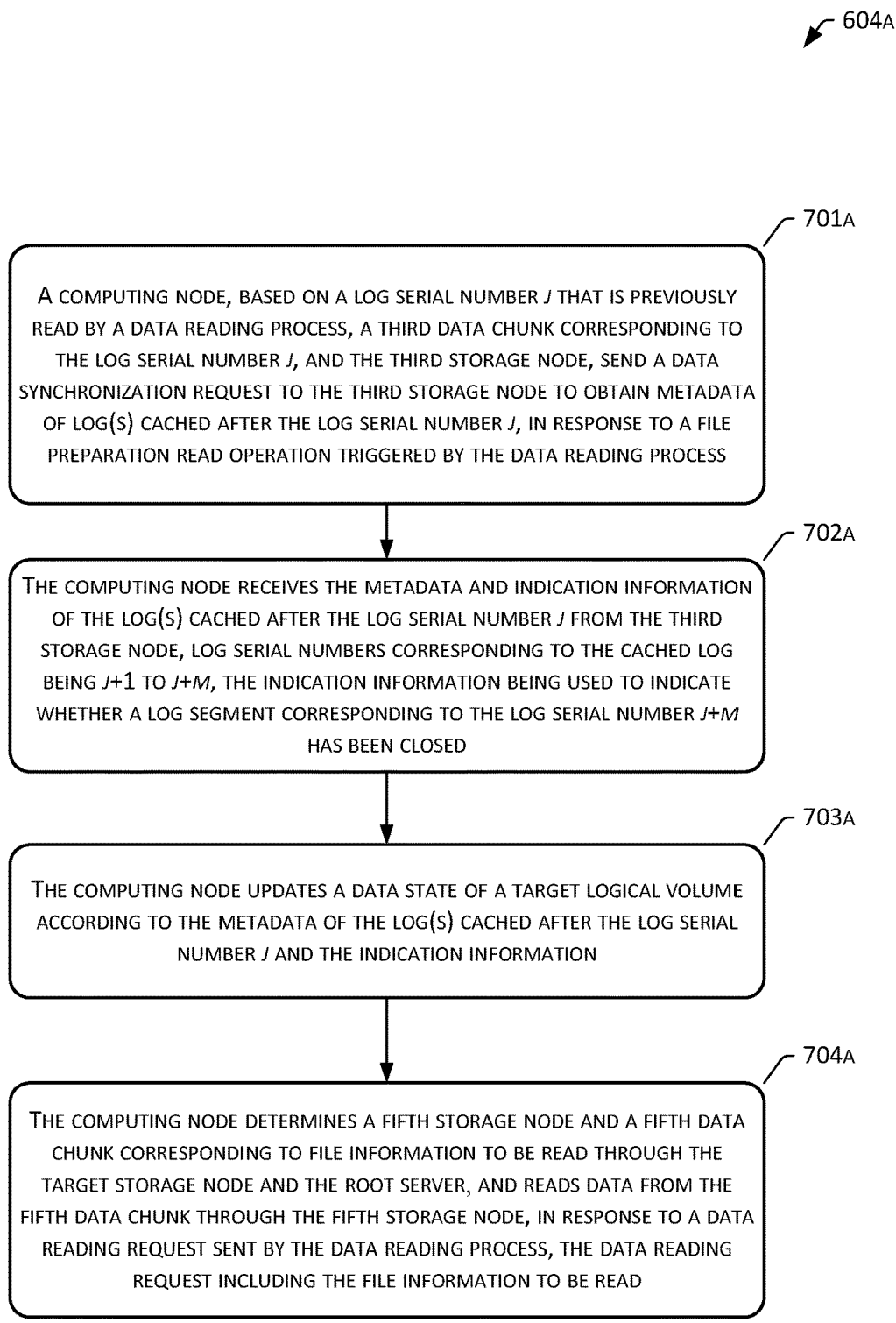

After restoring the latest data state of the target logical volume, the computing node can perform a subsequent process of data reading. The process of data reading often includes a file preparation reading phase and a data reading phase, which are described in subsequent embodiments as shown in FIG. 7a.

The foregoing embodiments shown in FIG. 6a illustrate an implementation process of a method for accessing data of a file system provided by the embodiments of the present disclosure from the perspective of computing nodes and storage nodes. Based on the logical system architecture shown in FIG. 2 or FIG. 3, and combined with the embodiments shown in FIG. 6b, another specific implementation process of the method for accessing data of a file system is described hereinafter.

Figure 6B:
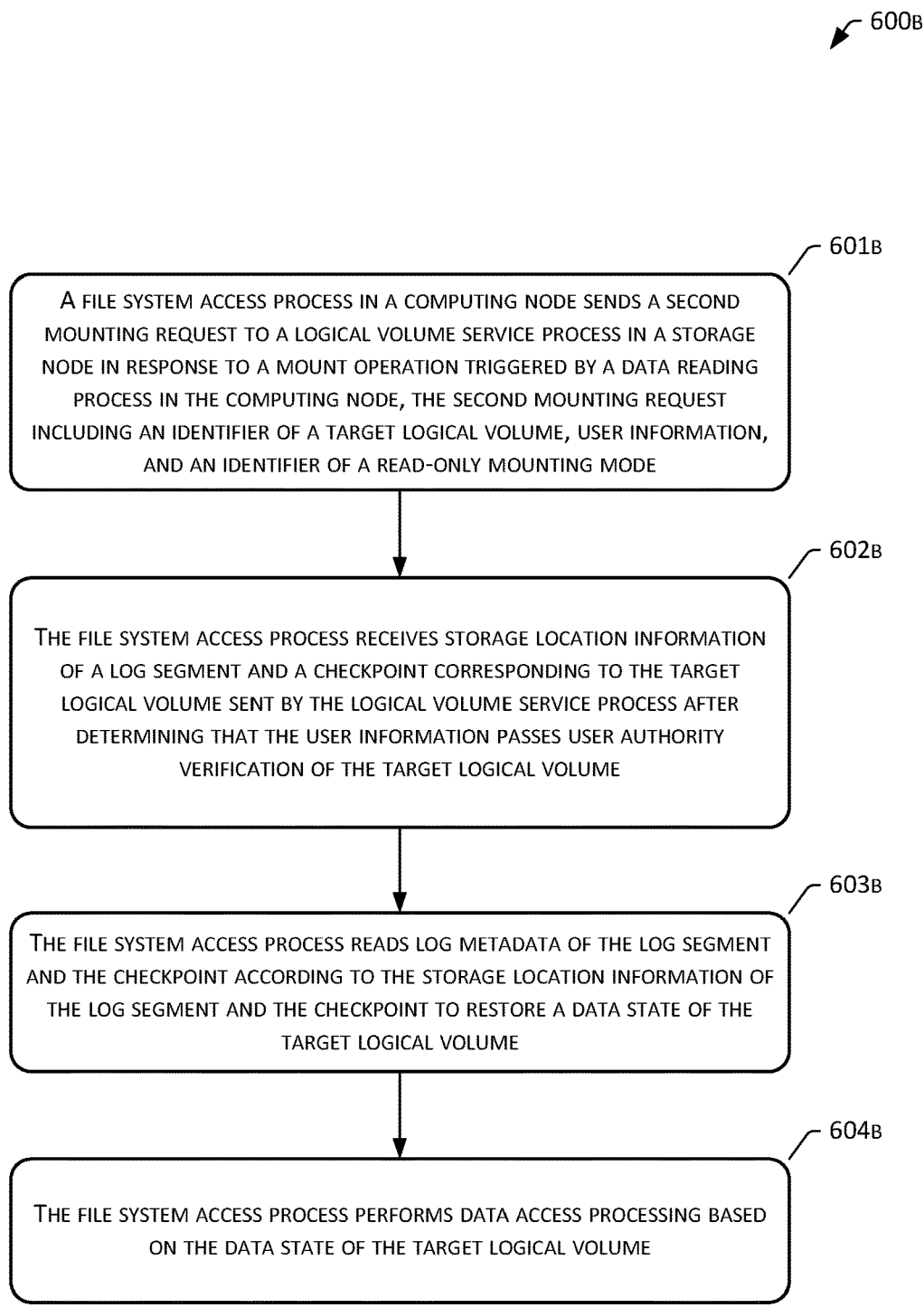
FIG. 6b is a flowchart of another method for accessing data of a file system according to the embodiments of the present disclosure.

FIG. 6b is a flowchart of another method 600b for accessing data of a file system provided by the embodiments of the present disclosure. The method provided by the embodiments of the present disclosure can be implemented by a file system access process (fuse worker) in a computing node under the architecture shown in FIG. 2 or FIG. 3. As shown in FIG. 6b, the method 600b includes the following steps.

601b: A file system access process in a computing node sends a second mounting request to a logical volume service process in a storage node in response to a mount operation triggered by a data reading process in the computing node, the second mounting request including an identifier of a target logical volume, user information, and an identifier of a read-only mounting mode.

The present embodiment introduces a situation where a service application in a computing node needs to perform data reading processing. Therefore, the service application starts a data reading process in the computing node. The data reading process first triggers a mounting operation for a target logical volume, for example, sending a second mounting request as described above to a file system access process to mount the target logical volume locally for performing subsequent data access.

602b: The file system access process receives storage location information of a log segment and a checkpoint corresponding to the target logical volume sent by the logical volume service process after determining that the user information passes user authority verification of the target logical volume.

In the embodiments of the present disclosure, multiple data reading processes are allowed to read data on a same target logical volume simultaneously. Therefore, the logical volume service process can allow a user to mount the target logical volume in a read-only mounting mode upon verifying that the user has the permission to use the target logical volume. At the same time, the logical volume service process returns storage location information of a log segment and a checkpoint of the target logical volume to the file system access process. The storage location information may be identifiers of data chunks where a log segment and a checkpoint of the target logical volume are respectively located, and which are determined by the logical volume service process according to maintained correspondence relationships between identifiers of log segments and checkpoints of each logical volume and identifiers of data chunks. Alternatively, the storage location information may further include identifier(s) of data chunk service process(es) corresponding to the identifiers of the data chunks, and the identifier(s) of the data chunk service process(es) may be obtained by the logical volume service process by querying any root server with the identifiers of the data chunks.

603b: The file system access process reads log metadata of the log segment and the checkpoint according to the storage location information of the log segment and the checkpoint to restore a data state of the target logical volume.

604b: The file system access process performs data access processing based on the data state of the target logical volume.

For further description of the foregoing steps, reference may be made to the introduction in the foregoing embodiments, which are not repeated herein. Through this mounting process, the file system access process can access all data that is currently possessed by the target logical volume.

Figure 7B:
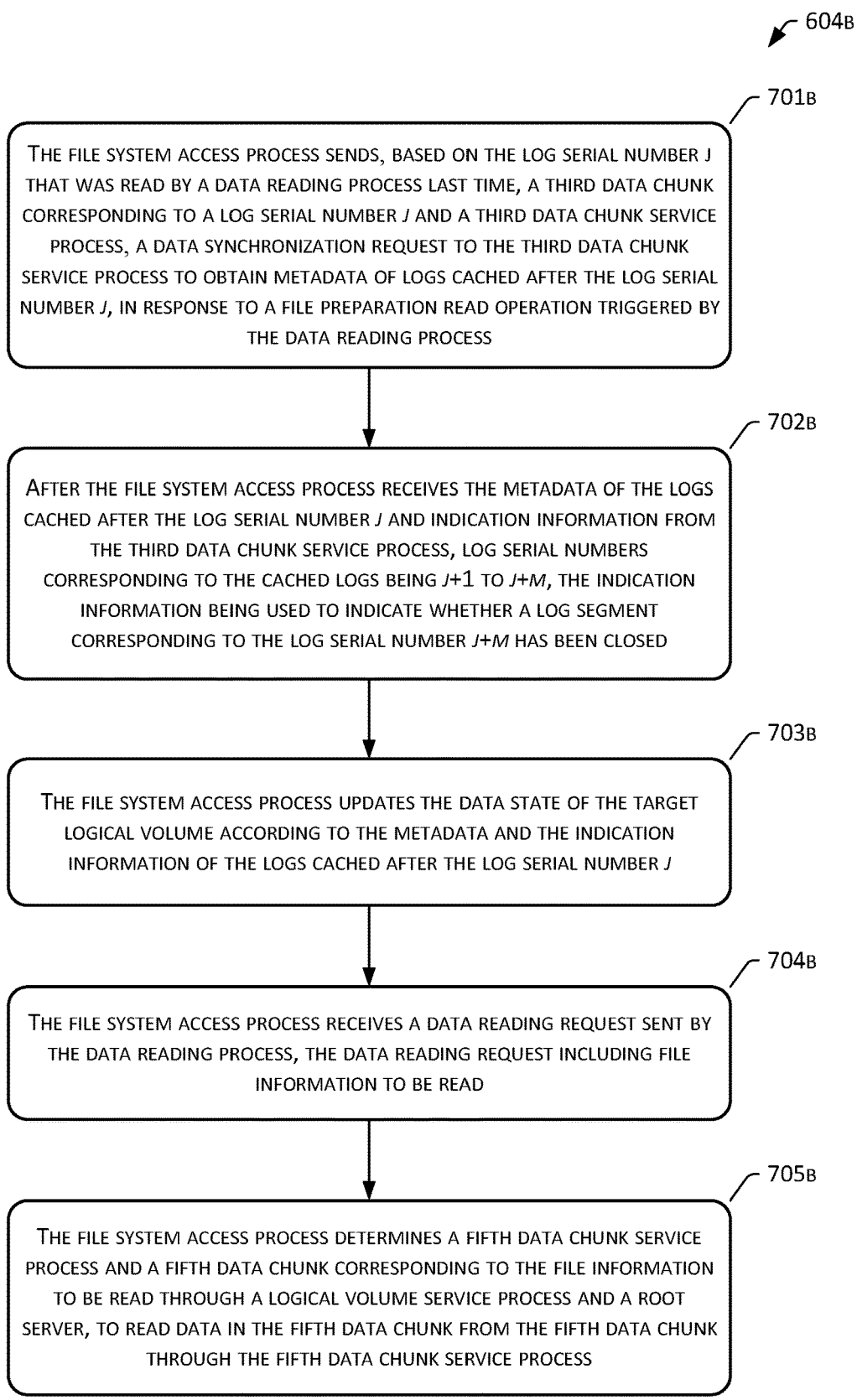
FIG. 7b is a flowchart of an implementation process of step 604b in the embodiments shown in FIG. 6b.

After the file system access process restores the latest data state of the target logical volume, a subsequent process of data reading can be performed. The process of data writing often includes a file preparation reading phase and a data reading phase, which are described in the following embodiments as shown in FIG. 7b.

FIG. 7a is a flowchart of an implementation process of step 604a in the embodiments shown in FIG. 6a. As shown in FIG. 7a, step 604a may specifically include the following specific steps.

701a: A computing node, based on a log serial number j that is previously read by a data reading process, a third data chunk corresponding to the log serial number j, and the third storage node, send a data synchronization request to the third storage node to obtain metadata of log(s) cached after the log serial number j, in response to a file preparation read operation triggered by the data reading process.

702a: The computing node receives the metadata and indication information of the log(s) cached after the log serial number j from the third storage node, log serial numbers corresponding to the cached log being j+1 to j+m, the indication information being used to indicate whether a log segment corresponding to the log serial number j+m has been closed.

703a: The computing node updates a data state of a target logical volume according to the metadata of the log(s) cached after the log serial number j and the indication information.

Before actually reading data, the data reading process often needs to perform some preparation operation. This preparation operation is called a file preparation read operation. In practical applications, the file preparation read operation may be, for example, opening a certain file. In the present embodiment, a procedure of processing of the file preparation read operation is first introduced.

The data reading process can trigger the above-mentioned file preparation operation by calling a corresponding interface of file preparation reading.

To facilitate an understanding of execution of step 701a, the present embodiment first introduces a practical data reading and writing scenario. A certain computing node is constantly writing data to a target logical volume, and other computing nodes are constantly reading data of the target logical volume. The purpose of reading may be performing a big data analysis, performing a data backup, etc. However, since multiple computing nodes that read data do not know when the computing node that writes data will write data, these computing often start reading based on a certain mechanism, such as periodic reading. For any computing node that reads data, it is assumed that data in a certain log is read last time, and reading data that is written after that log needs to be continued currently. However, from a completion of mounting the target logical volume to the current moment, new data may have been written. Therefore, at this time, in order to be able to read data in all logs that have existed since the last read log, the computing node needs to know the current moment and locations of each log segment of the target logical volume that is included between the last read log and the last log segment of the current moment, i.e., which data chunk(s) of which storage node(s).

At this time, optionally, the computing node can obtain thereof directly by querying the target storage node and a root server, similar to the process of obtaining a data chunk and a storage node where the last log segment is located in the foregoing embodiments.

However, optionally, since the computing node knows which log it has read last time, the computing node can also obtain locations of each log segment included between the log it has read last time and the last log segment of the current moment through the method provided in the present embodiment.

The computing node may locally store a log serial number j that its data reading process has read last time, a third data chunk corresponding to the log serial number j, and a third storage node corresponding to the third data chunk. Therefore, the computing node may send a data synchronization request to the third storage node to obtain metadata of the log(s) cached after the log serial number j.

Continuing with a writing result of the data writing process in the foregoing embodiments, if the log serial number of the last log currently stored in the target logical volume is i+2, it can be understood that j<(i+2).

The third data chunk includes at least various logs in a log segment to which the log serial number j belongs, and may also include one or more log segments after the log segment to which the log serial number j belongs. Alternatively, other data chunks that are located after the third data chunk in the third storage node may also include one or more log segments after the log segment to which the log serial number j belongs. Therefore, the third storage node may return metadata of log(s) locally cached after the log serial number j to the computing node.

In addition, as mentioned in the foregoing embodiments: if a certain log segment meets a closing condition, the log segment is closed. Therefore, if the third storage node stores logs with log serial numbers j+1 to j+m, where m>1, (j+m)≤(i+2)), the third storage node may determine whether a log segment to which the log serial number j+m belongs is closed. If it is closed, this means that other data chunks of other storage nodes also include other logs whose log serial numbers are located after j+m. At this time, the third storage node also returns indication information indicating that the log segment to which the log serial number j+m belongs has been closed to the computing node. On the contrary, if it is not closed, this means that the last log serial number of the target logical volume is j+m, and a log segment to which the log serial number j+m belongs is not closed. Therefore, at this time, the third storage node also returns indication information indicating that the log segment to which the log serial number j+m belongs is not closed to the computing node.

Therefore, the computing node updates a data state of the target logical volume based on the metadata of the cached logs with log serial numbers ranging from j+1 to j+m and the indication information sent by the third storage node.

Specifically, if the indication information indicates that the log segment corresponding to the log serial number j+m is not closed, the computing node directly updates the data state of the target logical volume according to the metadata of the cached logs with the log serial numbers j+1 to j+m, i.e., placing the metadata of the cached logs associated with j+1 to j+m in the memory.

Conversely, if the indication information indicates that the log segment corresponding to the log serial number j+m has been closed, the computing node determines respective fourth data chunk(s) storing log(s) cached after the log serial number j+m and respective fourth storage node(s) corresponding to the fourth data chunk(s) through the target storage node and the root server. The computing node sends a data synchronization request to the fourth storage node(s) to obtain metadata of the cached log(s) after the log serial number j+m. The computing node updates the data state of the target logical volume according to the metadata of the cached logs with log serial numbers j+1 to j+m and metadata of the cached log(s) after the log serial number j+m.

A process of determining respective fourth data chunk(s) storing log(s) cached after the log serial number j+m and respective fourth storage node(s) corresponding to the fourth data chunk(s) through the target storage node and the root server is similar to the process of obtaining the first data chunk where the last log segment is located and the first storage node in the foregoing embodiments, which are both implemented based on correspondence relationships between log segment identifiers and data chunk identifiers that are maintained in the target storage node, and correspondence relationships between data chunk identifiers and storage node identifiers that are maintained in the root server, and is not repeated herein.

After the computing node restores the latest state of the target logical volume to the current moment, the file preparation reading phase before actual data is read is completed. At this time, based on the latest data state of the target logical volume that is restored, the data reading process can read any data therein, and does not need to continue reading after the log that was read last time. Therefore, the data reading process can then proceed to an actual process of data reading, such as the following steps:

704a: The computing node determines a fifth storage node and a fifth data chunk corresponding to file information to be read through the target storage node and the root server, and reads data from the fifth data chunk through the fifth storage node, in response to a data reading request sent by the data reading process, the data reading request including the file information to be read.

The file information to be read includes, for example, a name of a file, a position (offset) of data to be read in the file, etc. After the aforementioned process of restoring the data state of the target logical volume, the computing node already knows metadata information of each log, and the metadata of each log records file information, which includes a file name, an offset, a file FID, etc. Therefore, the computing node can locate a log based on the file information in the data reading request, query the target storage node based on a log serial number of the log, obtain a fifth data chunk where a log segment (to which the log serial number belongs) is located, and query the root server using an identifier of the fifth data chunk to obtain a corresponding fifth storage node, so as to send a read request for reading corresponding data in the fifth data chunk to the fifth storage node, to read data that is needed.

In an optional embodiment, in response to the data reading request sent by the data reading process, the computing node may also execute again the steps 701a-703a of the process of obtaining log metadata between the log serial number j that was read last time and the latest log serial number of the current moment. This is because new log(s) written may be to the target logical volume between the time when the data reading process triggers the file preparation read operation and the time when the data reading process triggers the data reading request.

The embodiments shown in FIG. 7a describe a process of data reading from the perspective of computing nodes and the storage nodes. Based on the logical system architecture shown in FIG. 2 or FIG. 3, and combined with the embodiments shown in FIG. 7b, when a computing node and a storage node have a composition of internal service processes as shown in FIG. 2 or FIG. 3, a specific implementation of a process of data reading as shown in FIG. 7a is described hereinafter.

FIG. 7b is a flowchart of an implementation process of step 604b in the embodiments shown in FIG. 6b. As shown in FIG. 7b, step 604b may specifically include the following specific steps:

701b: The file system access process sends, based on the log serial number j that was read by a data reading process last time, a third data chunk corresponding to a log serial number j and a third data chunk service process, a data synchronization request to the third data chunk service process to obtain metadata of logs cached after the log serial number j, in response to a file preparation read operation triggered by the data reading process.

702b: After the file system access process receives the metadata of the logs cached after the log serial number j and indication information from the third data chunk service process, log serial numbers corresponding to the cached logs being j+1 to j+m, the indication information being used to indicate whether a log segment corresponding to the log serial number j+m has been closed.

703b: The file system access process updates the data state of the target logical volume according to the metadata and the indication information of the logs cached after the log serial number j.

Optionally, if the indication information indicates that the log segment corresponding to the log serial number j+m is not closed, the file system access process updates the data state of the target logical volume according to the metadata of the cached logs with the log serial numbers j+1 to j+m.

Optionally, if the indication information indicates that the log segment corresponding to the log serial number j+m has been closed, the file system access process determines respective fourth data chunk(s) storing log(s) cached after the log serial number j+m and respective fourth storage node(s) corresponding to the fourth data chunk(s) through the target storage node and the root server. The file system access process sends a data synchronization request to fourth data chunk service process(es) to obtain metadata of the log(s) cached after the log serial number j+m. The file system access process updates a data state of the target logical volume according to the metadata of the cached logs with log serial numbers from j+1 to j+m and the metadata of the log(s) cached after the log serial number j+m.

704b: The file system access process receives a data reading request sent by the data reading process, the data reading request including file information to be read.

705b: The file system access process determines a fifth data chunk service process and a fifth data chunk corresponding to the file information to be read through a logical volume service process and a root server, to read data in the fifth data chunk from the fifth data chunk through the fifth data chunk service process.

For further content in the above process of data reading, reference may be made to the relevant introduction in the embodiments shown in FIG. 7a, etc., which is not repeated herein.

In short, in combination with the entire processes of data writing and data reading, the embodiments of the present disclosure implements a shared solution of a log-based distributed file system. Specifically, a log serial number is used as a standard for state alignment of parties of reading and writing, avoiding read and write conflicts, ensuring read and write consistency. A data access mode of one write and multiple reads is supported, and multiple readers do not need to wait, thus reducing a delay of reading data. In addition, each storage node maintains log metadata information of each logical volume synchronously, which is equivalent to realizing a distributed management of log information of each logical volume. Any computing node can restore a data state of a corresponding logical volume through log metadata that is maintained in any storage node for performing subsequent data access processing, which greatly improves the scalability of a file system.

Figure 8A:
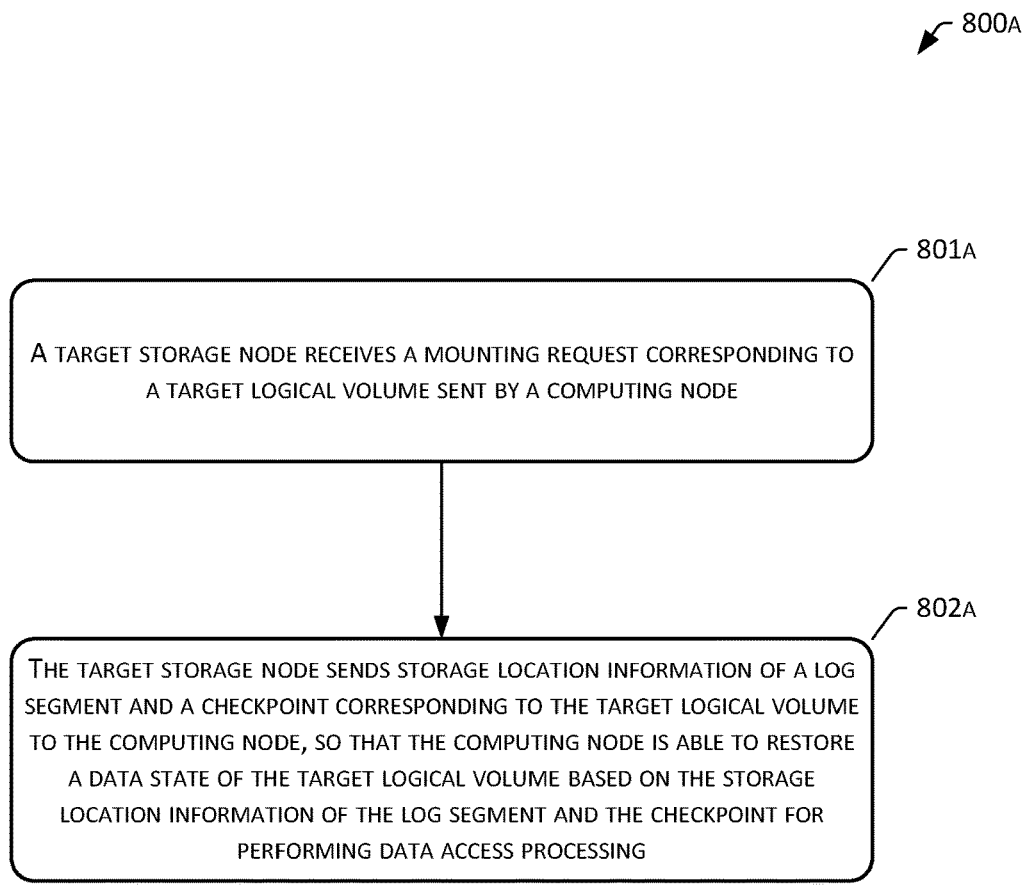
FIG. 8a is a flowchart of yet another method for accessing data of a file system according to the embodiments of the present disclosure.

FIG. 8a is a flowchart of yet another method 800a for accessing data of a file system according to the embodiments of the present disclosure. The method provided by the embodiments of the present disclosure can be executed by a target storage node under the architecture as shown in FIG. 1, where the target storage node is any one of multiple storage nodes of a file system. As shown in FIG. 8a, the method 800a includes the following steps:

801a: A target storage node receives a mounting request corresponding to a target logical volume sent by a computing node.

The computing node is any computing node in the file system.

802a: The target storage node sends storage location information of a log segment and a checkpoint corresponding to the target logical volume to the computing node, so that the computing node is able to restore a data state of the target logical volume based on the storage location information of the log segment and the checkpoint for performing data access processing.

The computing node reads log metadata from corresponding storage locations based on the storage location information of the log segment and the checkpoint, and replays the read log metadata in the memory to restore a data state of the target logical volume.

Details of a procedure of processing of a target storage node in processes of data writing and data reading are described hereinafter in conjunction with the following two optional embodiments.

In an optional embodiment, when a service business application in a computing node triggers a process of data writing, i.e., when a target logical volume needs to be mounted due to the need of data writing, a target storage node receives a first mounting request sent by the computing node. The first mounting request includes an identifier of a read-write mounting mode, an identifier of the target logical volume, and user information. The identifier of the read-write mounting mode corresponds to a data writing process in the computing node, which means that the data writing process needs to mount the target logical volume in a write-read mode. In this mode, the target logical volume can only be occupied by one data writing process at a certain time. At this time, the target storage node upon send storage location information of a log segment and a checkpoint corresponding to the target logical volume to the computing node after determining that the user information in the first mounting request has passed user authority verification of the target logical volume and determining that the target logical volume is not currently mounted in a read-write mode, i.e., not occupied by other data writing processes.

In another optional embodiment, when a certain service application in a computing node triggers a process of data reading, i.e., when a target logical volume needs to be mounted due to the need of data reading, the target storage node receives a second mounting request sent by the computing node. The second mounting request includes an identifier of a read-only mounting mode, an identifier of the target logical volume, and user information. The identifier of the read-only mounting mode corresponds to a data reading process in the computing node, which means that the data reading process needs to mount the target logical volume in a read-only mode. In this mode, the target logical volume can be occupied by multiple data reading processes. At this time, the target storage node sends storage location information of a log segment and a checkpoint corresponding to the target logical volume to the computing node after determining that the user information in the second mounting request passes user authority verification of the target logical volume.

During a process of data writing or data reading after the target logical volume is mounted, the target storage node also has the following functions:

receiving, by the target storage node, a query request sent by the computing node, the query request being used for querying a data chunk where a target log segment corresponding to the target logical volume is located;

determining, by the target storage node, an identifier of the data chunk where the target log segment is located according to maintained correspondence relationships between identifiers of log segments and identifiers of data chunks of the target logical volume; and sending, by the target storage node, the identifier of the data chunk to the computing node.

For example, corresponding to the process of data writing described in the embodiments shown in FIG. 5a, after the computing node generates a log, such as a first log or a second log in the embodiments as shown in FIG. 5a, based on a trigger of a data writing process, the computing node needs to store the currently generated log in a data chunk where the last log segment of the target logical volume is located. As such, the computing node needs to determine a data chunk and a storage node where the data chunk is located through the target storage node.

Based thereon, the target storage node needs to perform the following steps during the process of data writing:

receiving, by the target storage node, a first query request sent by the computing node after a log is generated, the first query request being used for querying a data chunk where the last log segment corresponding to the target logical volume is located;

determining, by the target storage node, an identifier of a first data chunk where the last log segment is located according to maintained correspondence relationships between identifiers of log segments and identifiers of data chunks of the target logical volume; and sending, by the target storage node, the identifier of the first data chunk to the computing node, so that the computing node is able to query a root server according to the identifier of the first data chunk to obtain a first storage node corresponding to the first data chunk, append the log to the first data chunk, and request the first storage node to cache metadata in the log.

Correspondence relationships between identifiers of data chunks and identifiers of storage nodes are maintained in the root server.

For another example, corresponding to the process of data reading described in the embodiments shown in FIG. 7a, when the computing node needs to determine a data chunk in which a log is stored after a log serial number j+m, the target storage node further need to perform the following steps during the process of data reading:

receiving, by the target storage node, a second query request sent by the computing node, the second query request being sent by the computing node after obtaining logs between a log serial number j and a log serial number j+m that have been read last time by the data reading process, and the second query request being used to request data chunk(s) of log(s) cached after the log serial number j+m;

determining, by the target storage node, identifier(s) of respective second data chunk(s) where the log(s) cached after the log serial number j+m is/are located according to maintained correspondence relationships between identifiers of log segments and identifiers of data chunks; and sending, by the target storage node, the identifier(s) of the respective second data chunk(s) to the computing node, to enable the computing node to query the root server according to the identifier(s) of respective second data chunk(s) to obtain second storage node(s) corresponding to the respective second data chunk(s), so as to obtain metadata of the log(s) cached after the log serial number after j+m from the respective second data chunk(s), and update a data state of the target logical volume according to the metadata of the log(s) cached after the log serial number j+m.

The foregoing refers to some processing that a target storage node may need to perform in processes of data writing and data reading. In addition, in the embodiments of the present disclosure, a garbage collection processing mechanism is also deployed for each storage node.

Since data written to a logical volume is written in a manner of log increments (i.e., writing in an append-only mode), data and metadata in a certain log becomes garbage when the data in the log is modified. In other words, the log becomes invalid. Therefore, a garbage collection mechanism is provided to reorganize and reclaim a storage space of previously written data.

Specifically, for a target storage node, the following process can be used to perform garbage collection processing:

selecting, by the target storage node, K log segments corresponding to a target logical volume and checkpoints corresponding to the K log segments to restore a corresponding data state;

in response to determining that a garbage proportion of M log segments in the K log segments reaches a preset threshold, the target storage node clearing invalid logs in the M log segments, writing the M log segments into new data chunks after clearing is completed, reclaiming original data chunks where the M log segments are located, and updating correspondence relationships between the M log segments and the data chunks, where the new data chunks are obtained by the target storage node from a root server.

In practical applications, before garbage collection processing is performed, the target storage node may first mount a target logical volume in a garbage collection mode, and the target logical volume may be any one of a plurality of logical volumes. The garbage collection mode means that log segments and checkpoints of the target logical volume can be rewritten.

At this time, the target storage node can select K log segments and checkpoints corresponding to the K log segments from various log segments and checkpoints corresponding to the various log segments of the target logical volume to restore a corresponding data state, i.e., playback log metadata of the K log segments and the checkpoints in the memory to restore the data state of the target logical volume corresponding to the K log segments. The K log segments may be, but are not limited to, consecutive K log segments.

Afterwards, the target storage node can traverse metadata of all the logs of the K log segments one by one to identify the validity of each log. For example, if an early log records that a certain file was created and a subsequent log records that the file was deleted, the early log becomes invalid. For another example, if an early log records that a piece of data was written in a file, but a subsequent log records that this piece of data was overwritten by new data, then the early log is invalid.

Therefore, the target storage node can sequentially determine a garbage ratio of each log segment in the K log segments, and the garbage ratio is defined as a ratio between the number of invalid logs in a log segment and the total number of logs included in the log segment.

Optionally, the target storage node may determine that all log segments whose garbage ratio exceeds a preset threshold in the K log segments are regarded as current recycling targets. For example, if garbage ratios of M log segments reach the preset threshold, K≤M≤1, these M log segments are determined to be treated as recycling targets.

Optionally, since the process of garbage collection also occupies processing resources of the target storage node, such as memory resources, the number of log segments reclaimed by the target storage node at one time can be controlled. Accordingly, optionally, the target storage node may also determine the recycling targets according to the following strategy. The target storage node sequentially traverses metadata of all logs included in the K log segments, and continuously calculates a ratio between the number of invalid logs in the currently traversed logs and the total number of logs in the traversed logs, i.e., continuously calculating a garbage ratio associated with the logs that have been traversed, until a log (called an end log) that causes the garbage ratio to reach the preset threshold is traversed, or the last log of a log segment to which the end log belongs is traversed. Therefore, the target storage node may determine that each log segment from the first log segment of the K log segments to the log segment to which the end log belongs are recycling targets, assuming that a total of M log segments are determined to be the recycling targets.

Therefore, when the target storage node determines that the garbage ratio of the M log segments in the K log segments reaches the preset threshold, the invalid logs in the M log segments are first cleared, i.e., the metadata and the data stored in the invalid logs is cleared For example, null-op is used to fill the invalid logs to reduce a storage space occupied by the invalid logs. New data chunk(s) is/are then requested from the root server to write the M log segments that have been cleared into the new data chunk(s), and original data chunks where the M log segments are located are reclaimed. Correspondence relationships between the M log segments and the data chunks are updated, i.e., correspondence relationships between identifiers of the M log segments and identifiers of the original data chunks are updated to correspondence relationships between the identifiers of the M log segments and identifiers of new data chunks. After updating the correspondence relationships, the target storage node may also synchronize the newly updated correspondence relationships with other storage nodes.

The foregoing embodiments shown in FIG. 8a illustrate a procedure of processing of a storage node involved in a process of accessing data of a file system from the perspective of the storage node. Based on the logical system architecture shown in FIG. 2 or FIG. 3 and in conjunction with the embodiments shown in FIG. 8b, a detailed process of implementation of the storage node in the foregoing procedure of processing is described hereinafter.

Figure 8B:
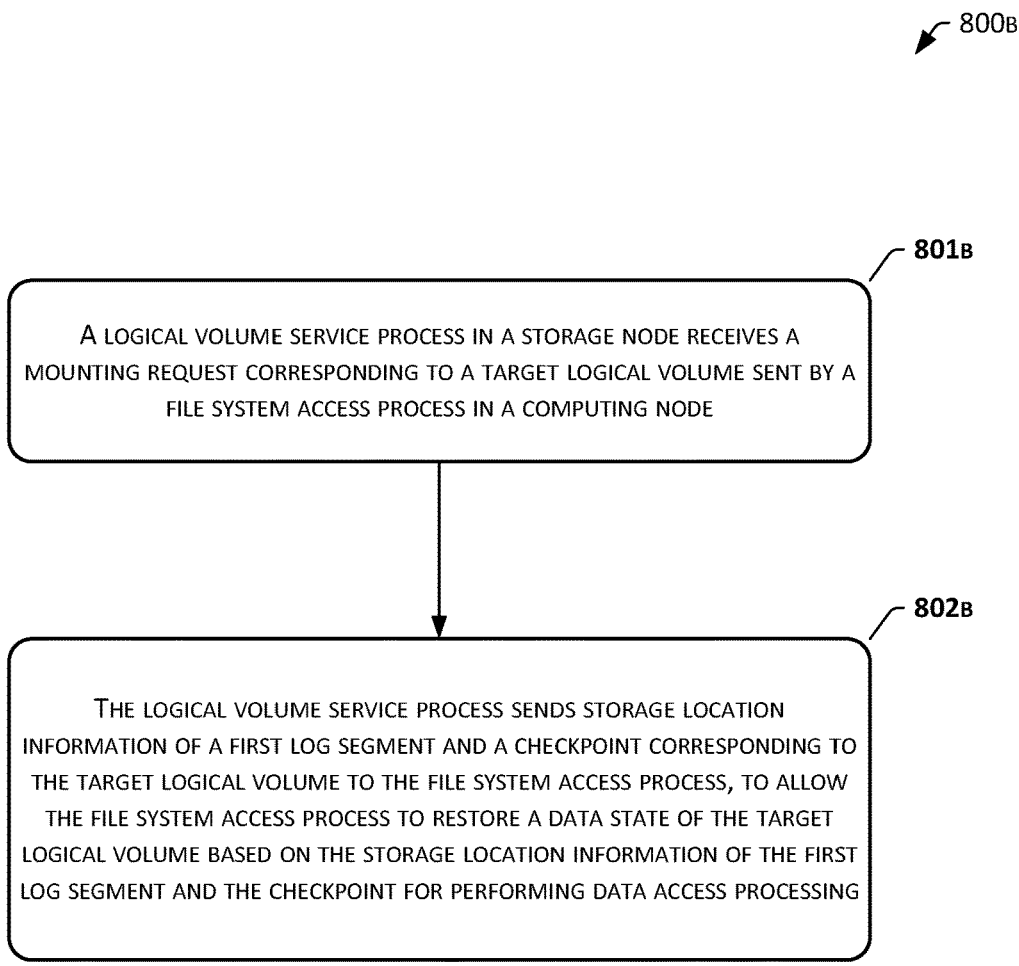
FIG. 8b is a flowchart of another method for accessing data of a file system according to the embodiments of the present disclosure.

FIG. 8b is a flowchart of another method 800b for accessing data of a file system provided by the embodiments of the present disclosure. An execution of the method provided by the embodiments of the present disclosure at least involves a logical volume service process (VS) and a garbage collection service process (GC) in a storage node under the architecture shown in FIG. 2 or FIG. 3. As shown in FIG. 8b, the method 800b includes the following steps:

801*b*: A logical volume service process in a storage node receives a mounting request corresponding to a target logical volume sent by a file system access process in a computing node.

801*b*: The logical volume service process sends storage location information of a first log segment and a checkpoint corresponding to the target logical volume to the file system access process, to allow the file system access process to restore a data state of the target logical volume based on the storage location information of the first log segment and the checkpoint for performing data access processing.

Details of a processing procedure of the logical volume service process in the storage node in a process of data writing and data reading are described hereinafter in conjunction with the following two optional embodiments.

In an optional embodiment, when a service business application in a computing node triggers a process of data writing, i.e., when a target logical volume needs to be mounted due to the needs of data writing, a file system access process in the computing node triggers a mount operation for the target logical volume. At this time, a logical volume service process in a storage node receives a first mounting request sent by the file system access process. The first mounting request includes an identifier of a read-write mounting mode and an identifier of the target logical volume, and user information. Therefore, the logical volume service process sends storage location information of a first log segment and a checkpoint corresponding to the target logical volume to the file system access process after determining that the user information has passed user authority verification of the target logical volume and determining that the target logical volume is not currently mounted in the read-write mounting mode.

In another optional embodiment, when a service application in a computing node triggers a process of data reading, i.e., when a target logical volume needs to be mounted due to the need of data reading, a file system access process in the computing node triggers a mount operation for the target logical volume. At this time, a logical volume service process in a storage node receives a second mounting request sent by the file system access process. The second mounting request includes an identifier of a read-only mounting mode and an identifier of the target logical volume and user information. Therefore, the logical volume service process sends storage location information of a first log segment and a checkpoint corresponding to the target logical volume to the file system access process after determining that the user information passes user authority verification of the target logical volume.

In a subsequent process of data writing or data reading of the file system access process after the target logical volume is mounted, the logical volume service process also has the following functions:

receiving, by the logical volume service process, a query request sent by the file system access process, the query request being used for query a data chunk where a target log segment corresponding to the target logical volume is located;

determining, by the logical volume service process, an identifier of the data chunk where the target log segment is located according to maintained correspondence relationships between identifiers of log segments and identifiers of data chunks; and sending, by the logical volume service process, the identifier of the data chunk to the file system access process.

For example, corresponding to the process of data writing described in the embodiments shown in FIG. 5*b*, after a file system access process generates a certain log, such as a first log or a second log in the embodiments shown in FIG. 5*b*, based on a trigger of a data writing process, the file system access process needs to store a currently generated log in a data chunk where the last log segment of a target logical volume is located. Therefore, the file system access process needs to determine a data chunk and a data chunk service process corresponding to the data chunk through the logical volume service process.

Accordingly, the logical volume service process also needs to perform the following steps during the process of data writing:

receiving, by the logical volume service process, a first query request sent by the file system access process after a log is generated, the first query request being used for querying a data chunk where the last log segment corresponding to the target logical volume is located;

determining, by the logical volume service process, an identifier of a first data chunk where the last log segment is located according to maintained correspondence relationships between identifiers of log segments and identifiers of data chunks;

sending, by the logical volume service process, the identifier of the first data chunk to the file system access process, to enable the file system access process to query a root server according to the identifier of the first data chunk to obtain a first data chunk service process corresponding to the first data chunk, and append the log to the first data chunk, and request the first data chunk service process to cache metadata in the log.

Correspondence relationships between identifiers of data chunks and identifiers of storage nodes are maintained in the root server.

For another example, corresponding to the process of data reading described in the embodiments shown in FIG. 7*b*, when a file system access process needs to determine data chunk(s) storing log(s) after a log serial number j+m, a logical volume service process needs to perform the following steps during the process of data reading:

receiving, by the logical volume service process, a second query request sent by the file system access process, the second query request being sent by the file system access process after obtaining logs between a log serial number j and a log serial number j+m that have been read last time by a data reading process, and the second query request being used to request data chunk(s) of log(s) cached after the log serial number j+m;

determining, by the logical volume service process, identifier(s) of respective second data chunk(s) where the log(s) cached after the log serial number j+m is/are located according to maintained correspondence relationships between identifiers of log segments and identifiers of data chunks; and sending, by the logical volume service process, the identifier(s) of the respective second data chunk(s) to the file system access process, to enable the file system access process to query a root server according to the identifier(s) of respective second data chunk(s) to obtain second data chunk service process(es) corresponding to the respective second data chunk(s), so as to obtain metadata of the log(s) cached after the log serial number after j+m from the respective second data chunk(s), and update a data state of the target logical volume according to the metadata of the log(s) cached after the log serial number j+m.

Since data written to a logical volume is written in a manner of log increments (i.e., writing in an append-only mode), data and metadata in a certain log becomes garbage when the data in the log is modified. In other words, the log becomes invalid. Therefore, the embodiments of the present disclosure further provide a garbage collection mechanism to reorganize and reclaim a storage space of previously written data. Specifically, a garbage collection service process (GC) deployed in each storage node cooperates with other service processes to complete garbage collection.

Specifically, for any storage node, garbage collection processing can be performed through the following process:
  receiving, by a logical volume service process in a storage node, a third mounting request corresponding to a target logical volume sent by a garbage collection service process in the storage node;
  sending, by the logical volume service process, storage location information of second log segments and checkpoints corresponding to the target logical volume to the garbage collection service process, to cause the garbage collection service process to select K log segments and checkpoints from the second log segments and checkpoints, to restore a corresponding data state and reclaim original data chunks where M log segments are located in response to determining that respective garbage ratios of the M log segments in the K log segments reach a preset threshold, K≤M≤1;
  receiving, by the logical volume service process, a log segment update notification sent by the garbage collection service process, the log segment update notification including correspondence relationships between the M log segments and new data chunks where the M log segments are located;
  updating, by the logical volume service process, original correspondence relationships between the M log segments and data chunks by the correspondence relationships between the M log segments and the new data chunks.

For a further description of the foregoing process of garbage collection, reference may be made to the related description in the embodiments shown in FIG. 8a, which is not repeated herein.

File system data access apparatuses of one or more embodiments of the present disclosure will be described in detail hereinafter. One skilled in the art can understand that all of these file system data access apparatuses can be configured using commercially available hardware components through the steps taught in the present solution.

Figure 9:
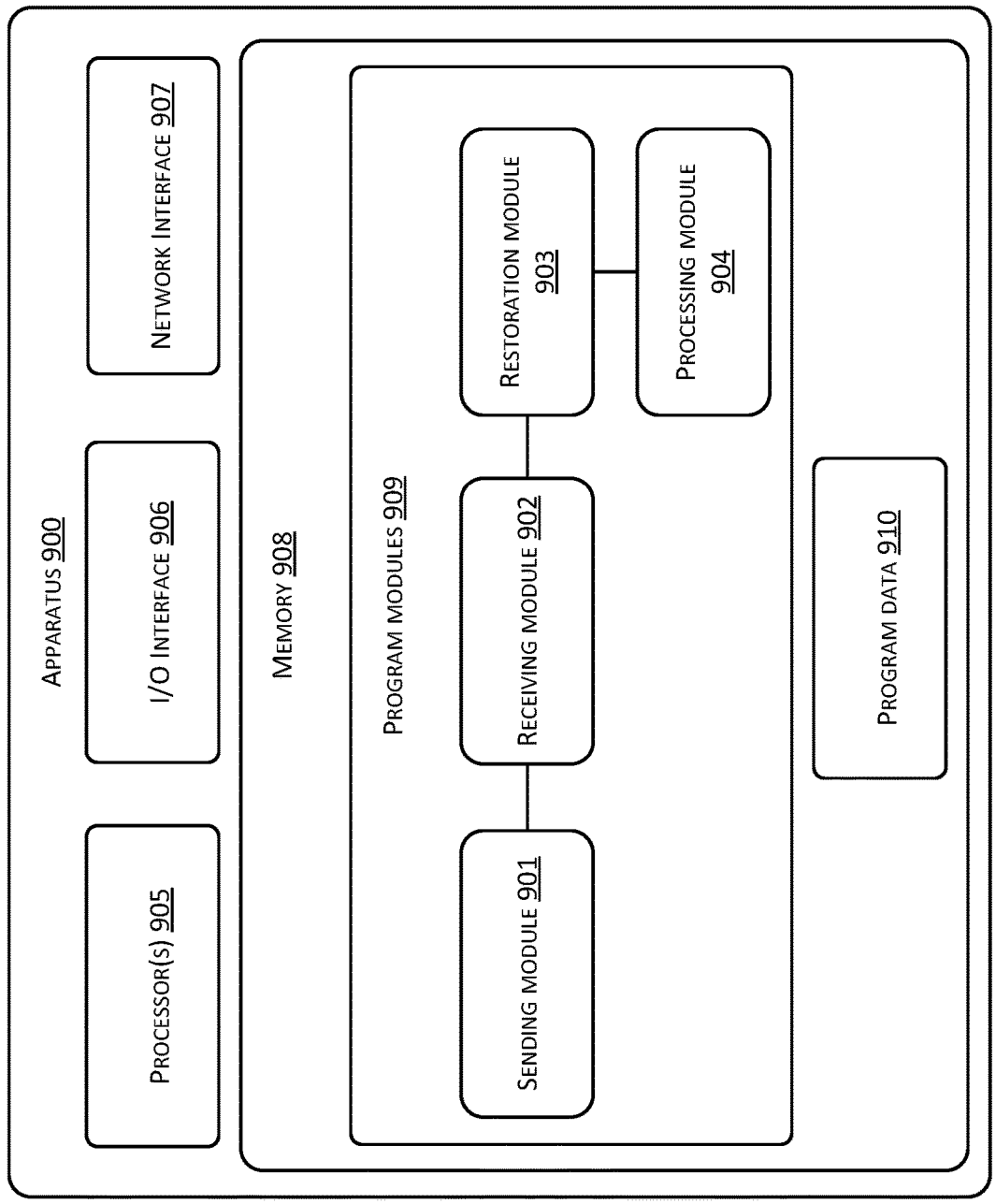
FIG. 9 is a schematic structural diagram of a file system data access apparatus provided by an embodiment of the present disclosure.

FIG. 9 is a schematic structural diagram of an apparatus 900 for accessing data of a file system provided by the embodiments of the present disclosure. As shown in FIG. 9, the apparatus includes: a sending module 901, a receiving module 902, a restoration module 903, and a processing module 904.

The sending module 901 is configured to send a mounting request triggered for a target logical volume to a target storage node, the target storage node being any one of multiple storage nodes, and the target logical volume corresponding to at least a part of storage resources in the multiple storage nodes.

The receiving module 902 is configured to receive storage location information of a log segment and a checkpoint corresponding to the target logical volume sent by the target storage node.

The restoration module 903 is configured to read log metadata of the log segment and the checkpoint according to the storage location information of the log segment and the checkpoint to restore a data state of the target logical volume.

The processing module 904 is configured to perform data access processing based on the data state of the target logical volume.

In implementations, the apparatus 900 may further include one or more processors 905, an input/output (I/O) interface 906, a network interface 907, and memory 908.

The memory 908 may include a form of computer readable media such as a volatile memory, a random access memory (RAM) and/or a non-volatile memory, for example, a read-only memory (ROM) or a flash RAM. The memory 908 is an example of a computer readable media. In implementations, the memory 908 may include program modules 909 and program data 910. The program modules 909 may include one or more modules as described in the foregoing description and FIG. 9.

In implementations, the computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The apparatus 900 shown in FIG. 9 can execute the methods of the embodiments shown in FIG. 4a, FIG. 5a, FIG. 6a, and FIG. 7a. For parts that are not described in detail in the present embodiment, reference can be made to the descriptions of the embodiments shown in FIG. 4a, FIG. 5a, FIG. 6a, and FIG. 7a.

Figure 10:
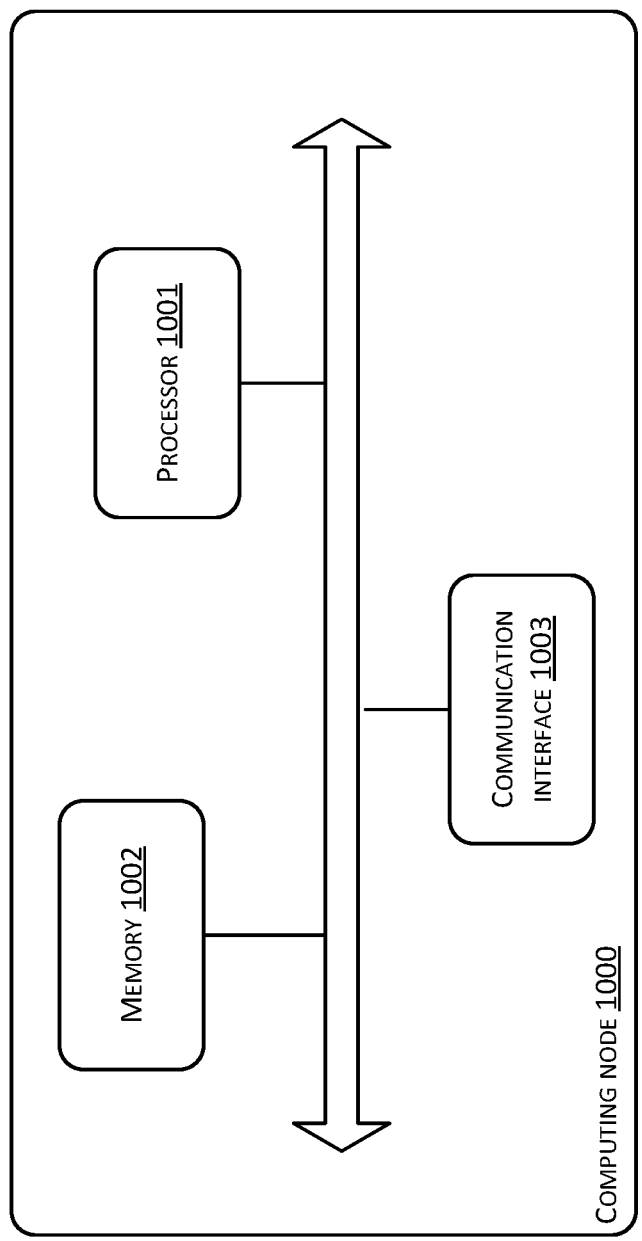
FIG. 10 is a schematic structural diagram of a computing node corresponding to the file system data access apparatus provided by the embodiments as shown in FIG. 9.

Internal functions and structure of the apparatus for accessing data of a file system are described above. In a possible design, the structure of the apparatus for accessing data of a file system can be implemented as a computing node, such as an application server, as shown in FIG. 10. In FIG. 10, a computing node 1000 may include a processor 1001 and a memory 1002, wherein the memory 1002 is configured to store a program that supports the apparatus for accessing data of a file system to execute the methods for accessing data of a file system provided in the embodiments shown in FIG. 4a, FIG. 5a, FIG. 6a, and FIG. 7a. The processor 1001 is configured to execute the program stored in the memory 1002.

The program includes one or more computer instructions, wherein the one or more computer instructions can implement the following steps when executed by the processor 1001:
  sending a mounting request triggered for a target logical volume to a target storage node, wherein the target storage node is any one of multiple storage nodes, and the target logical volume corresponds to at least some storage resources of the multiple storage nodes;

receiving storage location information of a log segment and a checkpoint corresponding to the target logical volume sent by the target storage node;

reading log metadata of the log segment and the checkpoint according to the storage location information of the log segment and the checkpoint to restore a data state of the target logical volume; and performing data access processing based on the data state of the target logical volume.

Optionally, the processor 1001 is further configured to execute all or part of the steps in the embodiments shown in FIG. 4*a*, FIG. 5*a*, FIG. 6*a*, and FIG. 7*a*.

The structure of the apparatus for accessing data of a file system may further include a communication interface 1003 configured to allow a user interface operation device to communicate with other devices or a communication network.

In addition, the embodiments of the present disclosure provide a computer storage medium that is used for storing computer software instructions used by the apparatus for accessing data of a file system, and includes a program involved in executing the methods for accessing data of a file system in the method embodiments as shown in FIG. 4*a*, FIG. 5*a*, FIG. 6*a*, and FIG. 7*a*.

Figure 11:
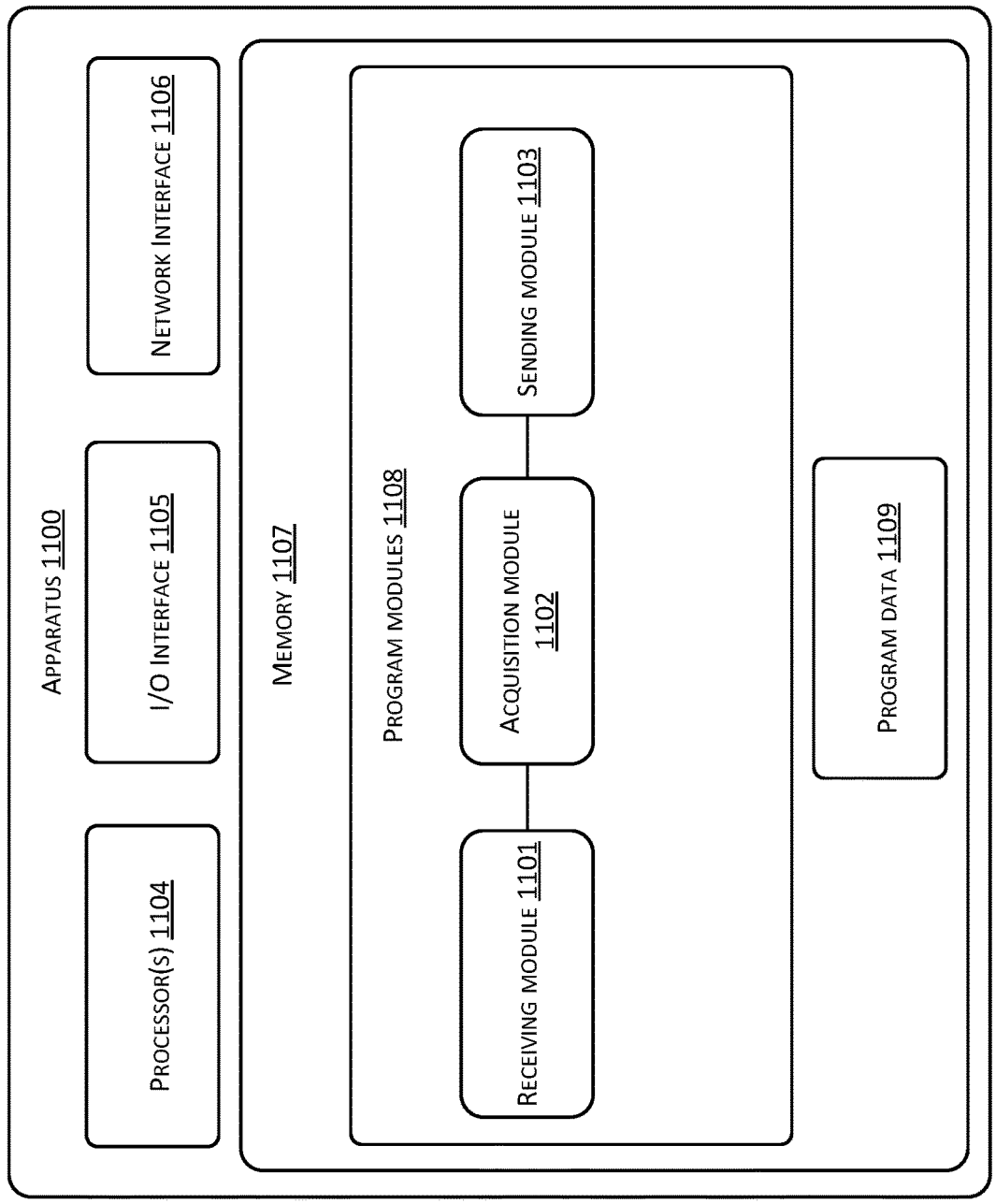
FIG. 11 is a schematic structural diagram of another file system data access apparatus provided by the embodiments of the present disclosure.

FIG. 11 is a schematic structural diagram of another apparatus 1100 for accessing data of a file system provided by the embodiments of the present disclosure. As shown in FIG. 11, the apparatus 1100 may include: a receiving module 1101, an acquisition module 1102, and a sending module 1103.

The receiving module 1101 is configured to receive a mounting request corresponding to a target logical volume sent by a computing node.

The acquisition module 1102 is configured to obtain storage location information of a log segment and a checkpoint corresponding to the target logical volume.

The sending module 1103 is configured to send the storage location information of the log segment and the checkpoint corresponding to the target logical volume to the computing node, to enable the computing node to restore a data state of the target logical volume based on the storage location information of the log segment and the checkpoint for performing data access processing, the target logical volume corresponding to at least a part of storage resources in multiple storage nodes.

In implementations, the apparatus 1100 may further include one or more processors 1104, an input/output (I/O) interface 1105, a network interface 1106, and memory 1107.

The memory 1107 may include a form of computer readable media as described in the foregoing description. In implementations, the memory 1107 may include program modules 1108 and program data 1109. The program modules 1108 may include one or more modules as described in the foregoing description and FIG. 11.

The apparatus 1100 shown in FIG. 11 can execute the methods of the embodiments shown in FIG. 8*a*. For parts that are not described in detail in the present embodiment, reference can be made to the related description of the embodiments shown in FIG. 8*a*.

Figure 12:
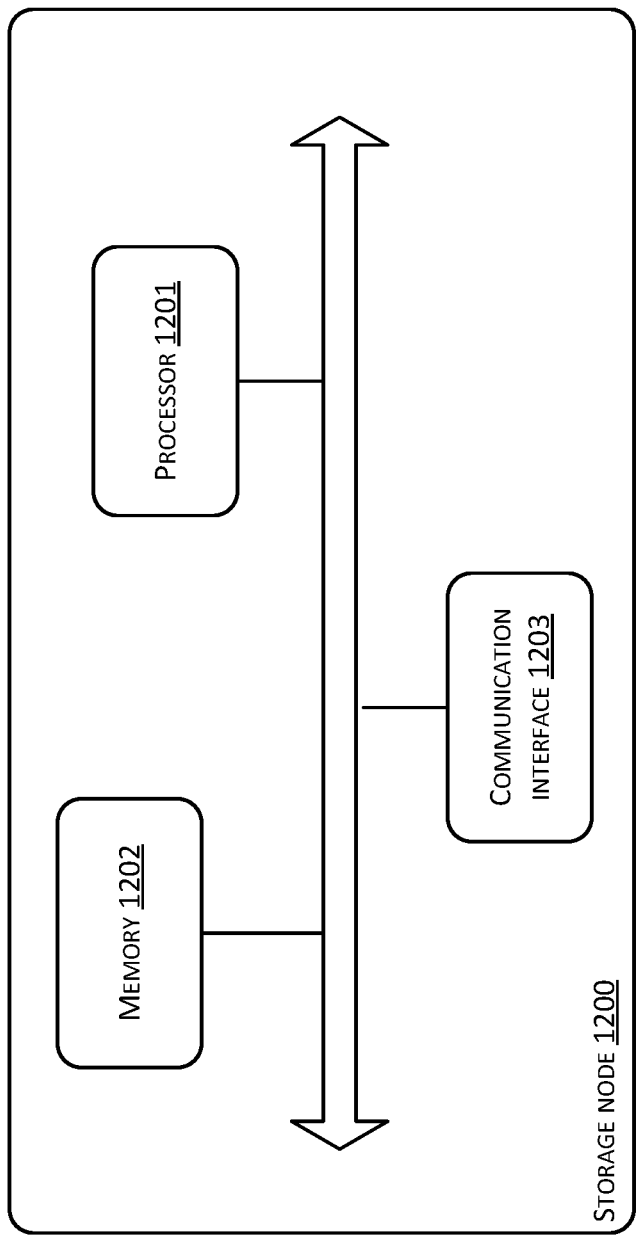
FIG. 12 is a schematic structural diagram of a storage node corresponding to the file system data access apparatus provided by the embodiments as shown in FIG. 11.

Internal functions and structure of the apparatus for accessing data of a file system are described above. In a possible design, the structure of the apparatus for accessing data of a file system can be implemented as a storage node, as shown in FIG. 12. In FIG. 12, a storage node 1200 may include a processor 1201 and a memory 1202, wherein the memory 1202 is configured to store a program that supports the apparatus for accessing data of a file system to execute the methods for accessing data of a file system provided in the embodiments shown in FIG. 8*a*. The processor 1201 is configured to execute the program stored in the memory 1202.

The program includes one or more computer instructions, wherein the one or more computer instructions can implement the following steps when executed by the processor 1201:

receiving a mounting request corresponding to a target logical volume sent by a computing node; and sending storage location information of a log segment and a checkpoint corresponding to the target logical volume to the computing node, to enable the computing node to restore a data state of the target logical volume based on the storage location information of the log segment and the checkpoint for performing data access processing, the target logical volume corresponding to at least a part of storage resources in multiple storage nodes.

Optionally, the processor 1201 is further configured to execute all or part of the steps in the embodiments shown in FIG. 8*a*.

The structure of the apparatus for accessing data of a file system may further include a communication interface 1203 configured to allow a user interface operation device to communicate with other devices or a communication network.

In addition, the embodiments of the present disclosure provide a computer storage medium that is used for storing computer software instructions used by the apparatus for accessing data of a file system, and includes a program involved in executing the methods for accessing data of a file system in the method embodiments as shown in FIG. 8*a*.

The apparatus embodiments described above are merely illustrative. The units described as separate components may or may not be physically separated. The components displayed as units may or may not be physical units, i.e., may be located in one place, or may be distributed over multiple network units. Some or all of the modules may be selected according to actual needs to achieve the objectives of the solutions of the embodiments. One of ordinary skill in the art can understand and implement them without making any creative effort.

Through the description of the above embodiments, one skilled in the art can clearly understand that each embodiment can be implemented with an addition of a necessary general hardware platform, and apparently can also be implemented by a combination of hardware and software. Based on such understanding, the essences of the above technical solutions or the parts that contribute to the existing technologies can be embodied in a form of computer products. The present disclosure can adopt a form of a computer program product implemented on one or more computer usable storage media including computer usable program codes (which include, but are not limited to, a magnetic disk, CD-ROM, an optical disk, etc.).

The present disclosure is described with reference to flowcharts and/or block diagrams of methods, devices (systems), and computer program products according to the embodiments of the present disclosure. It should be understood that each process and/or block in a flowchart and/or block diagram, and a combination of processes and/or blocks in the flowchart and/or block diagram can be implemented by computer program instructions. These computer program instructions can be provided to a processor of a general-purpose computer, a special-purpose computer, an embedded processor, or other programmable data processing device to generate a machine, so that an apparatus used for implementing functions specified in one or more processes in a flowchart and/or one or more blocks in a block diagram is generated by executing the instructions using the processor of the computer or other programmable data processing device.

These computer program instructions can also be stored in a computer-readable storage device that can guide a computer or other programmable data processing device to work in a specific way, so that the instructions stored in the computer-readable storage device produce an article of manufacture including an instruction apparatus. The instruction apparatus implements functions specified in one or more processes in a flowchart and/or one or more blocks in a block diagram.

These computer program instructions can also be loaded on a computer or other programmable data processing device, so that a series of operation steps are executed on the computer or other programmable device to produce computer-implemented processing, so that the instructions executed on the computer or other programmable device provide steps for implementing functions specified in one or more processes in a flowchart and/or one or more blocks in a block diagram.

In a typical configuration, a computing device includes one or more processors (CPU), an input/output interface, a network interface, and memory.

The memory may include a form of computer readable media such as a volatile memory, a random access memory (RAM) and/or a non-volatile memory, for example, a read-only memory (ROM) or a flash RAM. The memory is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Finally, it should be noted that the above embodiments are only used to illustrate the technical solutions of the present disclosure, and do not impose any limitations thereon. Although the present disclosure has been described in detail with reference to the foregoing embodiments, one of ordinary skill in the art should understand that: the technical solutions recorded in the foregoing embodiments can be modified, or some of the technical features thereof can be equivalently replaced. These modifications or replacements do not cause the essences of the corresponding technical solutions to deviate from the spirit and scope of the technical solutions of the embodiments of the present disclosure.

The present disclosure can further be understood using the following clauses.

Clause 1: A method for accessing data of a file system, wherein the file system comprises at least one computing node and multiple storage nodes, and the method comprises: sending, by the computing node, a mounting request triggered for a target logical volume to a target storage node, wherein the target storage node is any one of the multiple storage nodes, and the target logical volume corresponds to at least some storage resources of the multiple storage nodes; receiving, by the computing node, storage location information of a log segment and a checkpoint corresponding to the target logical volume sent by the target storage node; reading, by the computing node, log metadata of the log segment and the checkpoint according to the storage location information of the log segment and the checkpoint to restore a data state of the target logical volume; and performing, by the computing node, data access processing based on the data state of the target logical volume.

Clause 2: The method according to Clause 1, wherein sending, by the computing node, the mounting request triggered for the target logical volume to the target storage node comprises: sending, by the computing node, a first mounting request to the target storage node in response to a mount operation triggered by a data writing process, the first mounting request including an identifier of the target logical volume, user information, and an identifier of a write-read mounting mode; and receiving, by the computing node, the storage location information of the log segment and the checkpoint corresponding to the target logical volume sent by the target storage node comprises: receiving, by the computing node, the storage location information of the log segment and the checkpoint corresponding to the target logical volume sent by the target storage node after the target storage node determines that the user information has passed a user authority verification of the target logical volume and determines that the target logical volume is not currently mounted in the read-write mounting mode.

Clause 3: The method according to Clause 2, wherein performing, by the computing node, the data access processing based on the data state of the target logical volume comprises: generating, by the computing node, a first log including only metadata in response to a file preparation writing operation triggered by the data writing process, the first log including a log serial number i after a last log serial number i+1 of a current moment is incremented and file information corresponding to the file preparation operation; determining, by the computing node, a first data chunk where a last log segment corresponding to the target logical volume is located and a first storage node corresponding to the first data chunk through the target storage node and a root server; and sending, by the computing node, a log storage request to the first storage node to request the first log to be appended to the first data chunk and to request the first storage node to cache the first log.

Clause 4: The method according to Clause 3, wherein determining, by the computing node, the first data chunk where the last log segment corresponding to the target logical volume is located and the first storage node corresponding to the first data chunk through the target storage node and the root server, comprises: sending, by the computing node, a first query request to the target storage node for querying a data chunk where the last log segment corresponding to the target logical volume is located; receiving, by the computing node, an identifier of the first data chunk sent by the target storage node, wherein the identifier of the first data chunk is determined based on correspondence relationships between identifiers of log segments and identifiers of data chunks of the target logical volume maintained by the target storage node; sending, by the computing node, a second query request to the root server for querying a storage node corresponding to the identifier of the first data chunk; and receiving, by the computing node, an identifier of the first storage node sent by the root server, wherein the identifier of the first storage node is determined by the root server based on maintained correspondence relationships between identifiers of data chunks and identifiers of storage nodes.

Clause 5: The method according to Clause 3, wherein performing, by the computing node, the data access processing based on the data state of the target logical volume comprises: generating, by the computing node, a second log in response to a data writing request sent by the data writing process, the data writing request including written data and file information corresponding to the written data, the second log including metadata and the written data, and the metadata including a log serial number i+2 after a last log serial number i+1 of the current moment is incremented and the file information; determining, by the computing node, a second data chunk where the last log segment corresponding to the target logical volume is located and a second storage node corresponding to the second data chunk through the target storage node and the root server; sending, by the computing node, a log saving request to the second storage node to request the second log to be appended to the second data chunk and to request the second storage node to cache metadata in the second log.

Clause 6: The method according to Clause 3, further comprising: the computing node closing the last log segment, generating a new checkpoint, and requesting the target storage node for a new log segment as the last log segment, if the last log segment reaches a closing condition, wherein the closing condition is a number of logs included in the last log segment reaching a preset number or an amount of data corresponding to the last log segment reaching a preset capacity value.

Clause 7: The method according to Clause 1, wherein sending, by the computing node, the mounting request triggered for the target logical volume to the target storage node comprises: sending, by the computing node, a second mounting request to the target storage node in response to a mount operation triggered by a data reading process, the second mounting request including an identifier of the target logical volume, user information, and an identifier of a read-only mounting mode; and receiving, by the computing node, the storage location information of the log segment and the checkpoint corresponding to the target logical volume sent by the target storage node comprises: receiving, by the computing node, the storage location information of the log segment and the checkpoint corresponding to the target logical volume sent by the target storage node after determining that the user information passes user authority verification of the target logical volume.

Clause 8: The method according to Clause 7, wherein performing, by the computing node, the data access processing based on the data state of the target logical volume comprises: based on a log serial number j that is previously read by the data reading process, a third data chunk corresponding to the log serial number j, and the third storage node, the computing node sending a data synchronization request to the third storage node to obtain metadata of logs cached after the log serial number j, in response to a file read operation triggered by the data reading process; the computing node receiving the metadata and indication information of the logs cached after the log serial number j from the third storage node, log serial numbers corresponding to the cached log are j+1 to j+m, the indication information being used to indicate whether a log segment corresponding to the log serial number j+m has been closed; and the computing node updating the data state of the target logical volume according to the metadata of the logs cached after the log serial number j and the indication information.

Clause 9: The method according to Clause 8, wherein the computing node updating the data status of the target logical volume according to the metadata of the logs cached after the log serial number j and the indication information, comprises: the computing node updating the data status of the target logical volume the metadata according to the metadata of the cached logs with the log serial numbers j+1 to j+m If the indication information indicates that a log segment corresponding to the log serial number j+m is not closed.

Clause 10: The method according to Clause 8, wherein the computing node updating the data status of the target logical volume according to the metadata of the logs cached after the log serial number j and the indication information, comprises: if the indication information indicates that a log segment corresponding to the log serial number j+m has been closed, the computing node determining respective fourth data chunk(s) storing log(s) cached after the log serial number j+m and respective fourth storage node(s) corresponding to the fourth data chunk(s) through the target storage node and the root server, the computing node sending a data synchronization request to the fourth storage node(s) to obtain metadata of the cached log(s) after the log serial number j+m, and the computing node updating the data state of the target logical volume according to the metadata of the cached logs with log serial numbers j+1 to j+m, and metadata of the cached log(s) after the log serial number j+m.11. The method according to claim 8, wherein performing, by the computing node, the data access processing based on the data state of the target logical volume, comprises: determining, by the computing node, a fifth storage node and a fifth data chunk corresponding to file information to be read through the target storage node and a root server, to read data from the fifth data chunk through the fifth storage node, in response to a data reading request sent by the data reading process, the data reading request including the file information to be read.

Clause 12: A method for accessing data of a file system, wherein the file system includes at least one computing node and multiple storage nodes, and the method comprises: receiving, by a target storage node, a mounting request corresponding to a target logical volume sent by a computing node, wherein the target storage node is any one of the multiple storage nodes; and sending, by the target storage node, storage location information of a log segment and a checkpoint corresponding to the target logical volume to the computing node, to enable the computing node to restore a data status of the target logical volume based on the storage location information of the log segment and the checkpoint for performing data access processing, wherein the target logical volume corresponds to at least a part of storage resources in the multiple storage nodes.

Clause 13: The method according to Clause 12, wherein receiving, by the target storage node, the mounting request corresponding to the target logical volume sent by the computing node comprises: receiving, by the target storage node, a first mounting request sent by the computing node, the first mounting request including an identifier of a read-write mounting mode, an identifier of the target logical volume, and user information, and the identifier of the read-write mounting mode corresponding to a data writing process in the computing node; sending, by the target storage node, the storage location information of the log segment and the checkpoint corresponding to the target logical volume to the computing node comprises: sending, by the target storage node, the storage location information of the log segment and the checkpoint corresponding to the target logical volume to the computing node after determining that the user information passes user authority verification of the target logical volume and determining that the target logical volume is not currently mounted in the read-write mode.

Clause 14: The method according to Clause 12, wherein receiving, by the target storage node, the mounting request corresponding to the target logical volume sent by the computing node comprises: receiving, by the target storage node, a second mounting request sent by the computing node, the second mounting request including an identifier of a read-only mounting mode, an identifier of the target logical volume, and user information, and the identifier of the read-only mounting mode corresponding to a data reading process in the computing node; sending, by the target storage node, the storage location information of the log segment and the checkpoint corresponding to the target logical volume to the computing node comprises: sending, by the target storage node, the storage location information of the log segment and the checkpoint corresponding to the target logical volume to the computing node after determining that the user information passes user authority verification of the target logical volume.

Clause 15: The method according to Clause 12, further comprising: receiving, by the target storage node, a query request sent by the computing node, the query request being used for querying a data chunk where a target log segment corresponding to the target logical volume is located; determining, by the target storage node, an identifier of the data chunk where the target log segment is located according to maintained correspondence relationships between identifiers of log segments and identifiers of data chunks of the target logical volume; and sending, by the target storage node, the identifier of the data chunk to the computing node.

Clause 16: The method according to any one of Clauses 12 to 15, further comprising: selecting, by the target storage node, K log segments corresponding to the target logical volume and checkpoints corresponding to the K log segments to restore a corresponding data state; and in response to determining that garbage ratios of the M log segments in the K log segments reach a preset threshold, the target storage node clearing invalid logs in the M log segments, requesting new data chunk(s) from the root server, writing the M log segments into the new data chunk(s) after the clearing, reclaiming original data chunks where the M log segments are located, and updating correspondence relationships between the M log segments and the data chunks, where $K \leq M \leq 1$.

Clause 17: A file system comprising: at least one computing node, multiple storage nodes, and multiple root servers used for managing the multiple storage nodes, wherein: any computing node of the at least one computing node is configured to send a mounting request triggered for a target logical volume to any storage node of the multiple storage nodes, receive storage location information of a log segment and a checkpoint corresponding to the target logical volume sent by the any storage node, read log metadata of the log segment and the checkpoint according to the storage location information of the log segment and the checkpoint to restore a data state of the target logical volume, perform data access processing based on the data state of the target logical volume, the target logical volume corresponding to at least a part of storage resources in the multiple storage nodes; and the any storage node is configured to obtain the storage location information of the log segment and the checkpoint corresponding to the target logical volume, and send the storage location information of the log segment and the checkpoint to the any computing node.

Clause 18: A method for accessing data of a file system, wherein the file system includes at least one computing node and multiple storage nodes, and the method comprises: sending, by a file system access process in the computing node, a mounting request for a target logical volume to a logical volume service process in any storage node, in response to a mount operation triggered by a data access process in the computing node, the target logical volume corresponding to at least a part of storage resources in the multiple storage nodes; receiving, by the file system access process, storage location information of a log segment and a checkpoint corresponding to the target logical volume sent by the logical volume service process; reading, by the file system access process, log metadata of the log segment and the checkpoint according to the storage location information of the log segment and checkpoint to restore a data state of the target logical volume; and performing, by the file system access process, data access processing based on the data state of the target logical volume.

Clause 19: The method according to Clause 18, wherein the data access process is a data writing process, and sending, by the file system access process in the computing node, the mounting request for the target logical volume to the logical volume service process in the any storage node, in response to the mount operation triggered by the data access process in the computing node, comprises: the file system access process sending a first mounting request to the logical volume service process in response to a mount operation triggered by the data writing process, the first mounting request including an identifier of the target logical volume, user information, and an identifier of read-write mounting mode; receiving, by the file system access process, the storage location information of the log segment and checkpoint corresponding to the target logical volume sent by the logical volume service process comprises: receiving, by the file system access process, the storage location information of the log segment and checkpoint corresponding to the target logical volume sent by the logical volume service process after determining that the user information passes user authority verification of the target logical volume and determining that the target logical volume is not currently mounted in the read-write mounting mode.

Clause 20: The method according to Clause 19, wherein performing, by the file system access process, the data access processing based on the data state of the target logical volume, comprises: generating, by the file system access process, a first log including only metadata in response to a file preparation write operation triggered by the data writing process, the first log including a log serial number i+1 after a last log serial number i of a current moment is incremented, and file information corresponding to the file preparation request; determining, by the file system access process, a first data chunk where a last log segment corresponding to the target logical volume is located and a first data chunk service process corresponding to the first data chunk through the logical volume service process and a root server, the root server being configured to manage data chunk service processes in each storage node; and sending, by the file system access process, a log saving request to the first data chunk service process to request the first log to be appended to the first data chunk and request the first data chunk service process to cache the first log.

Clause 21: The method according to Clause 20, wherein determining, by the file system access process, the first data chunk where the last log segment corresponding to the target logical volume is located and the first data chunk service process corresponding to the first data chunk through the logical volume service process and the root server, comprises: sending, by the file system access process, a first query request to the logical volume service process for querying a data chunk where the last log segment corresponding to the target logical volume is located; receiving, by the file system access process, an identifier of the first data chunk sent by the logical volume service process, wherein the identifier of the first data chunk is determined by the logical volume service process based on maintained correspondence relationships between identifiers of log segments and identifiers of data chunks of the target logical volume; sending, by the file system access process, a second query request for querying a data chunk service process corresponding to the identifier of the first data chunk to a root server; and receiving, by the file system access process, an identifier of the first data chunk service process sent by the root server, where the identifier of the first data chunk service process is determined by the root server based on maintained correspondence relationships between identifiers of data chunks and identifiers of data chunk service processes.

Clause 22: The method according to Clause 20, wherein performing, by the file system access process, the data access processing based on the data state of the target logical volume, comprises: generating, by the file system access process, a second log in response to a data writing request sent by the data writing process, the data writing request including written data and file information corresponding to the written data, the second log including metadata and the written data, the metadata including a log serial number $i+2$ after a last log serial number $i+1$ of the current moment is incremented and the file information; determining, by the file system access process, a second data chunk where a last log segment corresponding to the target logical volume is located and a second data chunk service process corresponding to the second data chunk through the logical volume service process and the root server; and sending, by the file system access process, a log saving request to the second data chunk service process to request the second log to be appended to the second data chunk and request the second data chunk service process to cache metadata in the second log.

Clause 23: The method according to Clause 20, further comprising: generating a new checkpoint, and requesting a new log segment as the last log segment from the logical volume service process, if the last log segment reaches a closing condition, the file system access process closing the last log segment, wherein the closing condition is a number of logs included in the last log segment reaching a preset number or an amount of data corresponding to the last log segment reaching a preset capacity value.

Clause 24: The method according to Clause 18, wherein the data access process is a data reading process, and sending, by the file system access process in the computing node, the mounting request for the target logical volume to the logical volume service process in the any storage node, in response to the mount operation triggered by the data access process in the computing node, comprises: sending, by the file system access process, a second mounting request to the logical volume service process in response to a mount operation triggered by the data reading process, the second mounting request including an identifier of the target logical volume, user information and an identifier of read-only mounting mode; receiving, by the file system access process, the storage location information of the log segment and the checkpoint corresponding to the target logical volume sent by the logical volume service process comprises: receiving, by the file system access process, the storage location information of the log segment and the checkpoint corresponding to the target logical volume sent by the logical volume service process after determining that the user information passes user authority verification of the target logical volume.

Clause 25: The method according to Clause 24, wherein performing, by the file system access process, the data access processing based on the data state of the target logical volume, comprises: the file system access process, based on a log serial number j that is previously read by a data reading process, a third data chunk corresponding to the log serial number j, and the third storage node, send a data synchronization request to the third data chunk service process to obtain metadata of log(s) cached after the log serial number j, in response to a file preparation read operation triggered by the data reading process; the file system access process receiving the metadata and indication information of the log(s) cached after the log serial number j from the third storage node, log serial numbers corresponding to the cached log being j+1 to j+m, the indication information being used to indicate whether a log segment corresponding to the log serial number j+m has been closed; and the file system access process updating the data state of the target logical volume according to the metadata of the log(s) cached after the log serial number j and the indication information.

Clause 26: The method according to Clause 25, wherein the file system access process updating the data state of the target logical volume according to the metadata of the log(s) cached after the log serial number j and the indication information, comprises: the file system access process updating the data status of the target logical volume according to metadata of cached logs with the log serial numbers j+1 to j+m, if the indication information indicates that a log segment corresponding to the log serial number j+m is not closed.

Clause 27: The method according to Clause 25, wherein the file system access process updating the data state of the target logical volume according to the metadata of the log(s) cached after the log serial number j and the indication information, comprises: if the indication information indicates that a log segment corresponding to the log serial number j+m has been closed, the file system access process determining respective fourth data chunk(s) storing log(s) cached after the log serial number j+m and respective fourth storage node(s) corresponding to the fourth data chunk(s) through the target storage node and the root server, the file system access process sending a data synchronization request to the fourth storage node(s) to obtain metadata of the cached log(s) after the log serial number j+m, and the file system access process updating the data state of the target logical volume according to the metadata of the cached logs with log serial numbers j+1 to j+M, and metadata of the cached log(s) after the log serial number j+m.

Clause 28: The method according to Clause 25, wherein performing, by the file system access process, the data access processing based on the data state of the target logical volume, comprises: the file system access process receiving a data reading request sent by the data reading process, the data reading request including file information to be read; and the file system access process determining a fifth data chunk service process and a fifth data chunk corresponding to the file information to be read through the logical volume service process and the root server, to read data from the fifth data chunk through the fifth data chunk service process.

Clause 29: A method for accessing data of a file system, wherein the file system comprises at least one computing node and multiple storage nodes, and the method comprises: receiving, by a logical volume service process in a storage node, a mounting request corresponding to a target logical volume sent by a file system access process in a computing node; and sending, by the logical volume service process, storage location information of a first log segment and a checkpoint corresponding to the target logical volume to the file system access process, to cause the file system access process to restore a data state of the target logical volume for data access processing based on the storage location information of the first log segment and the checkpoint, the target logical volume corresponding to at least a part of storage resources in the multiple storage nodes, and the storage node being any one of the multiple storage nodes.

Clause 30: The method according to Clause 29, wherein receiving, by the logical volume service process in the storage node, the mounting request corresponding to the target logical volume sent by the file system access process in the computing node, comprises: receiving, by the logical volume service process, a first mounting request sent by the file system access process, the first mounting request including an identifier of a read-write mounting mode, an identifier of the target logical volume, and user information; and sending, by the logical volume service process, storage location information of the first log segment and the checkpoint corresponding to the target logical volume to the file system access process comprises: sending, by the logical volume service process, storage location information of the first log segment and the checkpoint corresponding to the target logical volume to the file system access process after determining that the user information has passed user authority verification of the target logical volume and determining that the target logical volume is not currently mounted in a read-write mount mode.

Clause 31: The method according to Clause 29, wherein receiving, by the logical volume service process in the storage node, the mounting request corresponding to the target logical volume sent by the file system access process in the computing node, comprises: receiving, by the logical volume service process, a second mounting request sent by the file system access process, the second mounting request including an identifier of a read-only mounting mode, an identifier of the target logical volume, and user information; sending, by the logical volume service process, storage location information of the first log segment and the checkpoint corresponding to the target logical volume to the file system access process comprises: sending, by the logical volume service process, storage location information of the first log segment and the checkpoint corresponding to the target logical volume to the file system access process after determining that the user information passes user authority verification of the target logical volume.

Clause 32: The method according to Clause 29, further comprising: receiving, by the logical volume service process, a query request sent by the file system access process, the query request being used for querying a data chunk where a target log segment corresponding to the target logical volume is located; determining, by the logical volume service process, an identifier of the data chunk where the target log segment is located according to maintained correspondence relationships between identifiers of log segments and identifiers of data chunks; and sending, by the logical volume service process, the identifier of the data chunk to the file system access process.

Clause 33: The method according to any one of Clauses 29 to 32, further comprising: receiving, by the logical volume service process, a third mounting request corresponding to the target logical volume sent by a garbage collection service process in the storage node; sending, by the logical volume service process, storage location information of second log segments and checkpoints corresponding to the target logical volume to the garbage collection service process, to enable the garbage collection service process select K log segments and checkpoints from the second log segments and checkpoints to restore a corresponding data state and reclaim original data chunks where M log segments are located in response to determining that respective garbage ratios of the M log segments in the K log segments reach a preset threshold. $K \leq M \leq 1$.

Clause 34: The method of Clause 33, further comprising: receiving, by the logical volume service process, a log segment update notification sent by the garbage collection service process, the log segment update notification including correspondence relationships between the M log segments and new data chunks where the M log segments are located; and updating, by the logical volume service process, original correspondence relationships to the correspondence relationships between the M log segments and the data chunks.

Clause 35: A file system comprising: at least one computing node, multiple storage nodes, and multiple root servers used for managing data chunk service processes in the multiple storage nodes, wherein: each computing node has a data access process and a file system access process; each storage node has a logical volume service process and a data chunk service process, the data chunk service process being used for reading and writing management of each data chunk stored in a corresponding storage node; the file system access process is configured to respond to a mount operation triggered by the data access process in a corresponding computing node, send a mounting request for a target logical volume to the logical volume service process in any storage node, receive storage location information of a first log segment and a checkpoint corresponding to the target logical volume sent by the volume service process, read metadata of the first log segment and the checkpoint based on the storage location information of the first log segment and the checkpoint to restore a data state of the target logical volume, and perform data access processing based on the data state of the target logical volume, the first log segment corresponding to metadata of the target logical volume, and the target logical volume corresponding to at least a part of storage resources in the multiple storage nodes; and the logical volume service process is configured to receive the mounting request sent by the file system access process, and send the storage location information of the first log segment and the checkpoint corresponding to the target logical volume to the file system access process.

Clause 36: The system according to Clause 35, wherein: each storage node further includes a garbage collection service process; the logical volume service process is further configured to receive a mounting request corresponding to the target logical volume sent by the garbage collection service process in the corresponding storage node, send storage location information of second log segments and checkpoints corresponding to the target logical volume to the garbage collection service process, receive a log segment update notification including correspondence relationships between M log segments and new data chunks where the M log segments are located from the garbage collection service process, and update original correspondence relationships by the correspondence relationships between the M log segments and the data chunks; the garbage collection service process is configured to select K log segments and checkpoints from the second log segments and checkpoints to restore a corresponding data state, clear invalid logs in the M log segments in response to determining that respective garbage ratio of the M log segments in the K log segments reach a preset threshold, and requesting the new data chunks from a root server to write the M log segments into the new data chunks after a clearing process, send a recycling notification to a data chunk service process corresponding to original data chunks where the M log segments are located, so that the data chunk service process reclaims the original data chunks, and sends the log segment update notification to the logical volume service process, where K≤M≤1.

What is claimed is:

1. A method implemented by a computing node, the method comprising:
   sending a mounting request triggered for a target logical volume to a target storage node, wherein a file system includes one or more computing nodes and multiple storage nodes, the target storage node includes any one of the multiple storage nodes, the target logical volume corresponds to at least some storage resources of the multiple storage nodes;
   receiving storage location information of a log segment and a checkpoint corresponding to the target logical volume sent by the target storage node, wherein:
      the target logical volume corresponds to multiple log segments and multiple checkpoints,
      the multiple log segments and the multiple checkpoints have correspondence relationships, and
      the checkpoint is used for restoring data when the file system is abnormal, and is a last checkpoint of the multiple checkpoints, the last checkpoint corresponding to a last log segment of the multiple log segments in the target logical volume, and recording a data state of the target logical volume before the last log segment;
   reading log metadata of the log segment and the checkpoint according to the storage location information of the log segment and the checkpoint to restore a data state of the target logical volume; and
   performing data access processing based on the data state of the target logical volume.

2. The method according to claim 1, wherein:
   sending the mounting request triggered for the target logical volume to the target storage node comprises:
      sending a first mounting request to the target storage node in response to a mount operation triggered by a data writing process, the first mounting request including an identifier of the target logical volume, user information, and an identifier of a write-read mounting mode; and
   receiving the storage location information of the log segment and the checkpoint corresponding to the target logical volume sent by the target storage node comprises:
      receiving the storage location information of the log segment and the checkpoint corresponding to the target logical volume sent by the target storage node after the target storage node determines that the user information has passed a user authority verification of the target logical volume and determines that the target logical volume is not currently mounted in the read-write mounting mode.

3. The method according to claim 2, wherein performing the data access processing based on the data state of the target logical volume comprises:
   generating a first log including only metadata in response to a file preparation writing operation triggered by the data writing process, the first log including a log serial number i after a last log serial number i+1 of a current moment is incremented and file information corresponding to the file preparation operation;
   determining a first data chunk where the last log segment corresponding to the target logical volume is located and a first storage node corresponding to the first data chunk through the target storage node and a root server; and
   sending a log storage request to the first storage node to request the first log to be appended to the first data chunk and to request the first storage node to cache the first log.

4. The method according to claim 3, wherein determining the first data chunk where the last log segment corresponding to the target logical volume is located and the first storage node corresponding to the first data chunk through the target storage node and the root server, comprises:
   sending a first query request to the target storage node for querying a data chunk where the last log segment corresponding to the target logical volume is located;
   receiving an identifier of the first data chunk sent by the target storage node, wherein the identifier of the first data chunk is determined based on correspondence relationships between identifiers of log segments and identifiers of data chunks of the target logical volume maintained by the target storage node;
   sending a second query request to the root server for querying a storage node corresponding to the identifier of the first data chunk; and
   receiving an identifier of the first storage node sent by the root server, wherein the identifier of the first storage node is determined by the root server based on maintained correspondence relationships between identifiers of data chunks and identifiers of storage nodes.

5. The method according to claim 3, wherein performing the data access processing based on the data state of the target logical volume comprises:
   generating a second log in response to a data writing request sent by the data writing process, the data writing request including written data and file information corresponding to the written data, the second log including metadata and the written data, and the metadata including a log serial number i+2 after a last log serial number i+1 of the current moment is incremented and the file information;
   determining a second data chunk where the last log segment corresponding to the target logical volume is located and a second storage node corresponding to the second data chunk through the target storage node and the root server; and
   sending a log saving request to the second storage node to request the second log to be appended to the second data chunk and to request the second storage node to cache metadata in the second log.

6. The method according to claim 3, further comprising:
   closing the last log segment, generating a new checkpoint, and requesting the target storage node for a new log segment as the last log segment, if the last log segment reaches a closing condition, wherein the closing condition is a number of logs included in the last log segment reaching a preset number or an amount of data corresponding to the last log segment reaching a preset capacity value.

7. The method according to claim 1, wherein:
sending the mounting request triggered for the target logical volume to the target storage node comprises:
sending a second mounting request to the target storage node in response to a mount operation triggered by a data reading process, the second mounting request including an identifier of the target logical volume, user information, and an identifier of a read-only mounting mode; and
receiving the storage location information of the log segment and the checkpoint corresponding to the target logical volume sent by the target storage node comprises:
receiving the storage location information of the log segment and the checkpoint corresponding to the target logical volume sent by the target storage node after determining that the user information passes user authority verification of the target logical volume.

8. The method according to claim 7, wherein performing the data access processing based on the data state of the target logical volume comprises:
based on a log serial number j that is previously read by the data reading process, a third data chunk corresponding to the log serial number j, and the third storage node, the sending a data synchronization request to the third storage node to obtain metadata of logs cached after the log serial number j, in response to a file read operation triggered by the data reading process;
receiving the metadata and indication information of the logs cached after the log serial number j from the third storage node, log serial numbers corresponding to the cached log are j+1 to j+m, the indication information being used to indicate whether a log segment corresponding to the log serial number j+m has been closed; and
updating the data state of the target logical volume according to the metadata of the logs cached after the log serial number j and the indication information.

9. The method according to claim 8, wherein updating the data status of the target logical volume according to the metadata of the logs cached after the log serial number j and the indication information, comprises:
updating the data status of the target logical volume the metadata according to the metadata of the cached logs with the log serial numbers j+1 to j+m If the indication information indicates that a log segment corresponding to the log serial number j+m is not closed.

10. The method according to claim 8, wherein node updating the data status of the target logical volume according to the metadata of the logs cached after the log serial number j and the indication information, comprises:
if the indication information indicates that a log segment corresponding to the log serial number j+m has been closed, determining respective fourth data chunk(s) storing log(s) cached after the log serial number j+m and respective fourth storage node(s) corresponding to the fourth data chunk(s) through the target storage node and the root server,
sending a data synchronization request to the fourth storage node(s) to obtain metadata of the cached log(s) after the log serial number j+m, and updating the data state of the target logical volume according to the metadata of the cached logs with log serial numbers j+1 to j+m, and metadata of the cached log(s) after the log serial number j+m.

11. The method according to claim 8, wherein performing the data access processing based on the data state of the target logical volume, comprises:
determining a fifth storage node and a fifth data chunk corresponding to file information to be read through the target storage node and a root server, to read data from the fifth data chunk through the fifth storage node, in response to a data reading request sent by the data reading process, the data reading request including the file information to be read.

12. One or more computer readable media storing executable instructions that, when executable by one or more processors of a target storage node, cause the one or more processors to perform acts comprising:
receiving a mounting request corresponding to a target logical volume sent by a computing node, wherein a file system includes one or more computing nodes and multiple storage nodes, and the target storage node includes any one of the multiple storage nodes; and
sending storage location information of a log segment and a checkpoint corresponding to the target logical volume to the computing node, to enable the computing node to restore a data status of the target logical volume based on the storage location information of the log segment and the checkpoint for performing data access processing, wherein:
the target logical volume corresponds to at least a part of storage resources in the multiple storage nodes,
the target logical volume corresponds to multiple log segments and multiple checkpoints,
the multiple log segments and the multiple checkpoints have correspondence relationships, and
the checkpoint is used for restoring data when the file system is abnormal, and is a last checkpoint of the multiple checkpoints, the last checkpoint corresponding to a last log segment of the multiple log segments in the target logical volume, and recording a data state of the target logical volume before the last log segment.

13. The one or more computer readable media according to claim 12, wherein:
receiving the mounting request corresponding to the target logical volume sent by the computing node comprises:
receiving a first mounting request sent by the computing node, the first mounting request including an identifier of a read-write mounting mode, an identifier of the target logical volume, and user information, and the identifier of the read-write mounting mode corresponding to a data writing process in the computing node; and
sending the storage location information of the log segment and the checkpoint corresponding to the target logical volume to the computing node comprises:
sending the storage location information of the log segment and the checkpoint corresponding to the target logical volume to the computing node after determining that the user information passes user authority verification of the target logical volume and determining that the target logical volume is not currently mounted in the read-write mode.

14. The one or more computer readable media according to claim 12, wherein:
receiving the mounting request corresponding to the target logical volume sent by the computing node comprises:
receiving a second mounting request sent by the computing node, the second mounting request including an identifier of a read-only mounting mode, an identifier of the target logical volume, and user information, and the identifier of the read-only mounting mode corresponding to a data reading process in the computing node; and
sending the storage location information of the log segment and the checkpoint corresponding to the target logical volume to the computing node comprises:
sending the storage location information of the log segment and the checkpoint corresponding to the target logical volume to the computing node after determining that the user information passes user authority verification of the target logical volume.

15. The one or more computer readable media according to claim 12, the acts further comprising:
receiving a query request sent by the computing node, the query request being used for querying a data chunk where a target log segment corresponding to the target logical volume is located;
determining an identifier of the data chunk where the target log segment is located according to maintained correspondence relationships between identifiers of log segments and identifiers of data chunks of the target logical volume; and
sending the identifier of the data chunk to the computing node.

16. The one or more computer readable media according to claim 12, the acts further comprising:
selecting K log segments corresponding to the target logical volume and checkpoints corresponding to the K log segments to restore a corresponding data state; and
in response to determining that garbage ratios of the M log segments in the K log segments reach a preset threshold, clearing invalid logs in the M log segments, requesting new data chunk(s) from the root server, writing the M log segments into the new data chunk(s) after the clearing, reclaiming original data chunks where the M log segments are located, and updating correspondence relationships between the M log segments and the data chunks, where K≥M≥1.

17. A computing node comprising:
one or more processors; and
memory, wherein a file system access process stored in the memory and executable by the or more processors is configured to:
send a mounting request for a target logical volume to a logical volume service process in any storage node, in response to a mount operation triggered by a data access process in the computing node, the target logical volume corresponding to at least a part of storage resources in the multiple storage nodes;
receive storage location information of a log segment and a checkpoint corresponding to the target logical volume sent by the logical volume service process, wherein:
the target logical volume corresponds to multiple log segments and multiple checkpoints,
the multiple log segments and the multiple checkpoints have correspondence relationships, and
the checkpoint is used for restoring data when the file system is abnormal, and is a last checkpoint of the multiple checkpoints, the last checkpoint corresponding to a last log segment of the multiple log segments in the target logical volume, and recording a data state of the target logical volume before the last log segment;
read log metadata of the log segment and the checkpoint according to the storage location information of the log segment and checkpoint to restore a data state of the target logical volume; and
perform data access processing based on the data state of the target logical volume.

18. The computing node according to claim 17, wherein the data access process comprises a data writing process, and sending the mounting request for the target logical volume to the logical volume service process in the any storage node, in response to the mount operation triggered by the data access process in the computing node, comprises:
sending a first mounting request to the logical volume service process in response to a mount operation triggered by the data writing process, the first mounting request including an identifier of the target logical volume, user information, and an identifier of read-write mounting mode;
receiving the storage location information of the log segment and checkpoint corresponding to the target logical volume sent by the logical volume service process comprises:
receiving the storage location information of the log segment and checkpoint corresponding to the target logical volume sent by the logical volume service process after determining that the user information passes user authority verification of the target logical volume and determining that the target logical volume is not currently mounted in the read-write mounting mode.

19. The computing node according to claim 18, wherein performing the data access processing based on the data state of the target logical volume, comprises:
generating a first log including only metadata in response to a file preparation write operation triggered by the data writing process, the first log including a log serial number i+1 after a last log serial number i of a current moment is incremented, and file information corresponding to the file preparation request;
determining a first data chunk where the last log segment corresponding to the target logical volume is located and a first data chunk service process corresponding to the first data chunk through the logical volume service process and a root server, the root server being configured to manage data chunk service processes in each storage node; and
sending a log saving request to the first data chunk service process to request the first log to be appended to the first data chunk and request the first data chunk service process to cache the first log.

20. The method according to claim 19, wherein determining the first data chunk where the last log segment corresponding to the target logical volume is located and the first data chunk service process corresponding to the first data chunk through the logical volume service process and the root server, comprises:
sending a first query request to the logical volume service process for querying a data chunk where the last log segment corresponding to the target logical volume is located;

receiving an identifier of the first data chunk sent by the logical volume service process, wherein the identifier of the first data chunk is determined by the logical volume service process based on maintained correspondence relationships between identifiers of log segments and identifiers of data chunks of the target logical volume;

sending a second query request for querying a data chunk service process corresponding to the identifier of the first data chunk to a root server; and receiving an identifier of the first data chunk service process sent by the root server, where the identifier of the first data chunk service process is determined by the root server based on maintained correspondence relationships between identifiers of data chunks and identifiers of data chunk service processes.

* * * * *